United States Patent

Shibata et al.

(10) Patent No.: US 10,075,990 B2
(45) Date of Patent: Sep. 11, 2018

(54) WIRELESS COMMUNICATION APPARATUS

(71) Applicant: Brother Kogyo Kabushiki Kaisha, Nagoya-shi, Aichi-ken (JP)

(72) Inventors: Hiroshi Shibata, Obu (JP); Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 612 days.

(21) Appl. No.: 14/633,835

(22) Filed: Feb. 27, 2015

(65) Prior Publication Data

US 2015/0250012 A1  Sep. 3, 2015

(30) Foreign Application Priority Data

Feb. 28, 2014 (JP) .................................. 2014-038345
Feb. 28, 2014 (JP) .................................. 2014-038346

(51) Int. Cl.
*H04W 72/04* (2009.01)
*H04W 76/14* (2018.01)
(Continued)

(52) U.S. Cl.
CPC ........... *H04W 76/14* (2018.02); *H04W 84/20* (2013.01); *H04W 84/18* (2013.01)

(58) Field of Classification Search
CPC ... H04W 76/02; H04W 72/04; H04W 76/023; H04W 84/20; H04W 84/18
(Continued)

(56) References Cited

U.S. PATENT DOCUMENTS 9,288,826 B2    3/2016  Shibata
2012/0224569 A1 9/2012  Kubota
(Continued)

FOREIGN PATENT DOCUMENTS

JP  2012-186555 A   9/2012
JP  2012-186643 A   9/2012
JP  2013-157943 A   8/2013

OTHER PUBLICATIONS

Jan. 24, 2017—(JP) Notification of Reasons for Rejection—App 2014-038346.
(Continued)

*Primary Examiner* — Melvin Marcelo
*Assistant Examiner* — Natali N Pascual Peguero
(74) *Attorney, Agent, or Firm* — Banner & Witcoff, Ltd.

(57) ABSTRACT

A wireless communication apparatus may perform receiving, from a terminal device, a signal for forming a specific wireless network including the wireless communication apparatus and the terminal device. The wireless communication apparatus may perform determining whether the related information is related to a first frequency band. The wireless communication apparatus may perform determining, by comparing the terminal index value and an apparatus index value being set in advance in the wireless communication apparatus, whether the terminal device is more likely to become a parent station than the wireless communication apparatus. The wireless communication apparatus may perform forming a second wireless network in which a second frequency band is to be used, in a case where it is determined that the related information is related to the first frequency band and it is determined that the terminal device is more likely to become the parent station than the wireless communication apparatus.

13 Claims, 11 Drawing Sheets

(51) Int. Cl.
*H04W 84/20* (2009.01)
*H04W 84/18* (2009.01)

(58) Field of Classification Search
USPC .................................................. 370/254, 338
See application file for complete search history.

(56) References Cited

U.S. PATENT DOCUMENTS

| | | | |
|---|---|---|---|
| 2013/0194962 A1* | 8/2013 | Abraham | H04W 8/005 370/254 |
| 2013/0196702 A1 | 8/2013 | Shibata | |
| 2013/0260683 A1 | 10/2013 | Suzuki et al. | |
| 2013/0260819 A1* | 10/2013 | Suzuki | H04W 88/06 455/552.1 |
| 2013/0329600 A1* | 12/2013 | Vedula | H04W 76/023 370/254 |
| 2014/0079045 A1* | 3/2014 | Kim | H04W 4/008 370/338 |

OTHER PUBLICATIONS

Wi-Fi Alliance Technical Committee P2P Task Group, "Wi-Fi Peer-to-Peer (P2P) Technical Specification", Version 1.1, pp. 1-159, released Oct. 4, 2010.

* cited by examiner (First Embodiment)

(First Embodiment; Case A1)

(First Embodiment; Case A2)

(First Embodiment; Case A3)

(Third Embodiment)

(Third Embodiment; Case B3)

WIRELESS COMMUNICATION APPARATUS

CROSS-REFERENCE TO RELATED APPLICATION

This application claims priority to Japanese Patent Application No. 2014-038346, filed on Feb. 28, 2014, and Japanese Patent Application No. 2014-038345, filed on Feb. 28, 2014, the contents of which are hereby incorporated by reference into the present application.

TECHNICAL FIELD

This specification discloses a technique for forming a wireless network including a wireless communication apparatus and a terminal device.

DESCRIPTION OF RELATED ART

In "Wi-Fi Peer-to-Peer (P2P) Technical Specification Version 1.1" Wi-Fi Alliance, 2010, Wi-Fi Direct (hereinafter referred to as "WFD") formulated by the Wi-Fi Alliance is described. A wireless network of the WFD is configured by one apparatus operating as a Group Owner (hereinafter referred to as "G/O apparatus") and one or more apparatuses (hereinafter referred to as "CL apparatus") operating as a client managed by the G/O apparatus. When connection conforming to the WFD should be established between a pair of apparatuses, each of the pair of apparatuses executes a G/O negotiation and determines as to which of the G/O and the CL the apparatuses should operate.

BRIEF SUMMARY OF INVENTION

This specification discloses a technique that may appropriately form a wireless network when a wireless network including a wireless communication apparatus and a terminal device should be formed.

A wireless communication apparatus may comprise a processor. The wireless communication apparatus may comprise an instruction memory storing computer-readable instructions therein. The computer-readable instructions, when executed by the processor, may cause the wireless communication apparatus to perform receiving, from a terminal device, a signal for forming a specific wireless network including the wireless communication apparatus and the terminal device, the specific wireless network being either of a first wireless network or a second wireless network, the first network being a network in which the terminal device operates as a parent station and the wireless communication apparatus operates as a child station, the second network being a network in which the wireless communication apparatus operates as the parent station and the terminal device operates as the child station, the signal including related information related to a frequency band to be used in the first wireless network and a terminal index value being set in advance in the terminal device. The computer-readable instructions, when executed by the processor, may cause the wireless communication apparatus to perform determining whether the related information is related to a first frequency band. The computer-readable instructions, when executed by the processor, may cause the wireless communication apparatus to perform determining, by comparing the terminal index value and an apparatus index value being set in advance in the wireless communication apparatus, whether the terminal device is more likely to become the parent station than the wireless communication apparatus. The computer-readable instructions, when executed by the processor, may cause the wireless communication apparatus to perform forming the second wireless network in which a second frequency band different from the first frequency band is to be used, in a first case where it is determined that the related information is related to the first frequency band and it is determined that the terminal device is more likely to become the parent station than the wireless communication apparatus.

Note that a controlling method, computer executable instructions, and a non-transitory computer readable medium for storing the computer executable instructions which are for realizing the wireless communication device described above are newly useful. A communication system including the wireless communication device, the access point and the terminal device is also newly useful.

DETAILED DESCRIPTION (First Embodiment)

Figure 1:
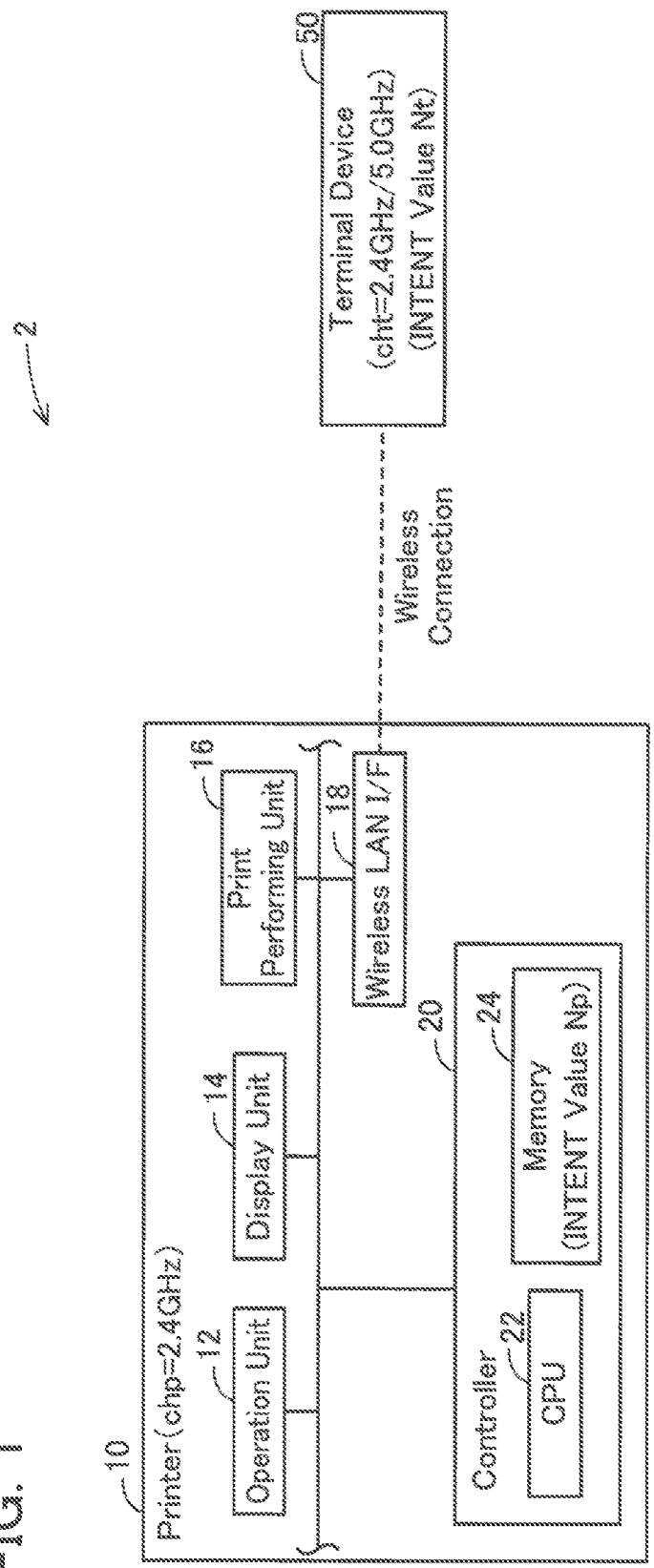
FIG. 1 shows a configuration of a communication system.

As shown in FIG. 1, a communication system 2 comprises a printer 10 and a terminal device 50. Each of the printer 10 and the terminal device 50 is capable of performing wireless communication of a Wi-Fi scheme, which is a communication system formulated by the Wi-Fi Alliance, (i.e., Wi-Fi communication).

(Configuration of the Printer 10)

The printer 10 is a peripheral apparatus (i.e., a peripheral apparatus such as a personal computer (PC)) capable of performing a printing function. The printer 10 comprises an operation unit 12, a display unit 14, a print performing unit 16, a wireless Local Area Network (LAN) interface 18, and a controller 20. In the following explanation, an interface is described as "I/F".

The operation unit 12 comprises a plurality of keys. A user can input various instructions to the printer 10 by operating the operation unit 12. The display unit 14 is a display for displaying various kinds of information. The print performing unit 16 is a printing mechanism of an inkjet system, a laser system, or the like.

The wireless LAN I/F 18 is an interface for executing wireless communication of the Wi-Fi scheme. The Wi-Fi scheme is a wireless communication scheme conforming to, for example, a standard of 802.11 of The Institute of Electrical and Electronics Engineers, Inc. (IEEE) or a standard corresponding to the standard of 802.11 (e.g., 802.11a, 11b, 11g, and 11n).

More specifically, the wireless LAN I/F 18 supports a Wi-Fi direct (WFD) scheme formulated by the Wi-Fi Alliance. Therefore, the controller 20 can perform the Wi-Fi communication via the wireless LAN I/F 18 by using a wireless network of the WFD scheme (hereinafter referred to as "WFDNW"). Details of the WFD scheme are described in "Wi-Fi Peer-to-Peer (P2P) Technical Specification Version 1.1" created by the Wi-Fi Alliance. United States Patent Application Publication No. 2013/0260683 also discloses the details of the WFD scheme. The document is referred to and cited.

Two kinds of frequency bands of 2.4 GHz and 5.0 GHz are used for the wireless communication of the Wi-Fi scheme. Specifically, in the wireless communication of the Wi-Fi scheme, the wireless communication is performed using radio waves (i.e., carrier waves) in the frequency bands of 2.4 GHz and 5.0 GHz. The wireless LAN I/F 18 supports only the frequency band of 2.4 GHz and does not support the frequency band of 5.0 GHz of the two kinds of frequency bands of 2.4 GHz and 5.0 GHz used in the wireless communication of the Wi-Fi scheme. That is, the wireless LAN I/F 18 is capable of executing the wireless communication in which only the radio wave in the frequency band of 2.4 GHz is used and incapable of executing the wireless communication in which the radio wave in the frequency band of 5.0 GHz is used. In the following explanation in this specification, "the wireless LAN I/F 18 supports the frequency band of 2.4 GHz and does not support the frequency band of 5.0 GHz" is sometimes expressed as "the printer 10 is adapted to only 2.4 GHz". As shown in FIG. 1, a frequency band chp to which the printer 10 is adapted is only 2.4 GHz. That is, the printer 10 can perform the wireless communication in which the 2.4 GHz band is used but cannot perform the wireless communication in which the 5.0 GHz band is used.

The controller 20 comprises a CPU 22 and a memory 24. The CPU 22 is a processor that executes various kinds of processes according to a computer program stored in the memory 24. Note that, in FIG. 1, the memory 24 has stored therein an INTENT value Np set in advance in the printer 10. The INTENT value is explained below.

(Configuration of the Terminal Device 50)

The terminal device 50 is a portable terminal device such as a mobile phone (e.g., a smart phone), a PDA, a notebook PC, a tablet PC, a digital camera, a portable music player, or a portable motion picture player. Note that, in a modification, the terminal device 50 may be a standalone terminal device such as a desktop PC.

The terminal device 50 comprises a wireless LAN I/F and a memory not shown in the figure. The wireless LAN I/F of the terminal device 50 supports both the frequency bands of the 2.4 GHz band and the 5.0 GHz band. In the following explanation in this specification, "the wireless LAN I/F of the terminal device 50 supports both the frequency bands of the 2.4 GHz band and the 5.0 GHz band" is sometimes expressed as "the terminal device 50 is adapted to both of 2.4 GHz and 5.0 GHz." That is, as shown in FIG. 1, a frequency hand cht to which the terminal device 50 is adapted is both of the 2.4 GHz band and the 5.0 GHz band. That is, the terminal device 50 can perform both of the wireless communication in which the 2.4 GHz band is used and the wireless communication in which the 5.0 GHz band is used. The memory of the terminal device 50 has stored therein an INTENT value Nt set in advance in the printer 10.

(WFD Scheme)

Subsequently, the WFD scheme is explained. A specification of the WFD defines, as states of a WFD apparatus, three states, i.e., a Group Owner state (hereinafter referred to as "G/O state"), a client state (hereinafter referred to as "CL state"), and a device state. The WFD apparatus is capable of selectively operating in one state among the three states.

A WFD apparatus in the G/O state (i.e., a G/O apparatus) is an apparatus that forms a wireless network (i.e., WFDNW) in which the WFD apparatus operates as a parent station. A WFD apparatus in the CL state (i.e., a CL apparatus) is an apparatus operating as a child station of the WFDNW. A WFD apparatus in the device state (i.e., a device apparatus) is an apparatus not belonging to the WFDNW.

The WFDNW to which both of the G/O apparatus and the CL apparatus belong is formed by, for example, any one of two procedures explained below. In a first procedure, a pair of device apparatuses performs wireless communication called G/O negotiation. Consequently, one of the pair of device apparatuses determines to be in the G/O state (i.e., the G/O apparatus) and the other determines to be in the CL state (i.e., the CL apparatus). The G/O apparatus forms the WFDNW. Further, the G/O apparatus performs wireless communication of data for connection called a 'WPS negotiation' between the G/O apparatus and the CL apparatus. Thereafter, the G/O apparatus establishes connection to the CL apparatus. Consequently, the WFDNW to which both of the G/O apparatus and the CL apparatus belong is formed.

In a second procedure, the device apparatus autonomously shifts to the G/O state and forms the WFDNW without performing the G/O negotiation. In this case, after the WFDNW is formed, the other device apparatus shifts to the CL state without performing the G/O negotiation. Further, the G/O apparatus performs wireless communication of data for connection called a WPS negotiation between the G/O apparatus and the CL apparatus. Thereafter, the G/O apparatus establishes connection to the CL apparatus. Consequently, the WFDNW to which both of the G/O apparatus and the CL apparatus belong is formed.

The G/O negotiation performed in the first procedure is further explained. In the G/O negotiation, processes explained below are executed between the pair of device apparatuses. A first apparatus, which is one of the pair of device apparatuses, sends a G/O negotiation Request to a second apparatus, which is the other device apparatus. The G/O negotiation Request is a request signal for requesting a start of the G/O negotiation. The G/O negotiation Request may be rephrased as a request signal for requesting transmission of a G/O negotiation Response. The G/O negotiation Request includes first related information related to a first frequency band (the 5.0 GHz band or the 2.4 GHz band), which is stored in a memory of the first apparatus as a frequency band that should be used in the WFDNW when the first apparatus operates as the G/O apparatus, and a first INTENT value set in advance in the first apparatus.

When receiving the G/O negotiation request, the second apparatus sends a G/O negotiation Response, which is a response signal to the O/O negotiation Request, to the first apparatus. The G/O negotiation Response includes second related information related to a second frequency band (the 5.0 GHz or the 2.4 GHz), which should be used in the WFDNW when the second apparatus operates as the G/O apparatus, and a second INTENT value set in advance in the second apparatus.

The first related information is information indicating one of a plurality of channels that supports the first frequency band. Similarly, the second related information is also information indicating one of the plurality of channels that supports the first frequency band. Therefore, the first apparatus can determine, by referring to the second related information, which of the 2.4 GHz band and the 5.0 GHz band the second frequency band is. The second apparatus can perform the same determination.

The INTENT value is an index value indicating a degree of how much the device apparatus should be the G/O. The INTENT value is any value in a numerical value range of 0 to 15. The device apparatus is more likely to become the G/O apparatus as the INTENT value is larger. In other words, the device apparatus is more likely to become the CL apparatus as the INTENT value is smaller. The first apparatus compares the first INTENT value and the second INTENT value and determines the G/O apparatus and the CL apparatus. Specifically, if the first INTENT value is larger than the second INTENT value, the first apparatus determines that the first apparatus becomes the G/O apparatus. The second apparatus also determines the G/O apparatus and the CL apparatus according to the same method. Note that, if the first INTENT value and the second INTENT value are the same, one of the first apparatus and the second apparatus is determined as the G/O apparatus at random.

When receiving the G/O negotiation Response and determining the G/O apparatus and the CL apparatus, the first apparatus sends Confirmation (Success) to the second apparatus. The Confirmation (Success) includes information indicating which of the first apparatus and the second apparatus is the G/O apparatus. For example, if the first apparatus is determined as the G/O apparatus, the first apparatus forms the WFDNW in which a frequency band related to the first related information is used. On the other hand, if the second apparatus is determined as the G/O apparatus, the second apparatus forms the WFDNW in which a frequency band related to the second related information is used.

When the first apparatus cannot determine the G/O apparatus and the CL apparatus after receiving the G/O negotiation Response, the first apparatus sends Confirmation (Fail) to the second apparatus. In this case, the WFDNW is not formed.

Note that the G/O negotiation Request and Response, the Confirmation (success), and the Confirmation (Fail) are sent and received using the 2.4 GHz band. Therefore, for example, even in a situation in which the first apparatus is adapted to only the 2.4 GHz band and the second apparatus is adapted to both of the 2.4 GHz and 5.0 GHz, the pair of device apparatuses can send the G/O negotiation Request and Response, the Confirmation (Success), and the Confirmation (Fail).

In the WPS negotiation, wireless communication of data for connection is executed between the G/O apparatus and the CL apparatus. The wireless communication of the data for connection is performed using the frequency band (i.e., 2.4 GHz or 5.0 GHz) used in the WFDNW. The data for connection is data (i.e., data not including information concerning the network layer) including information concerning lower layers (e.g., a physical layer and a data link layer) lower than a network layer of an OSI reference model. The data for connection includes, for example, Probe Request/Response signals, Provision Discovery Request/Response signals, Authentication Request/Response signals, Association Request/Response signals, WSC Exchange, and 4-Way Handshake.

The G/O apparatus is capable of executing wireless communication of target data with the CL apparatus not via another apparatus. The target data is data including information concerning the network layer of the OSI reference model and information concerning a higher layer (e.g., an application layer) higher than the network layer. The target data includes, for example, image data representing an image of a printing target. The G/O apparatus is capable of relaying the wireless communication of the target data between a pair of CL apparatuses. Consequently, in the WFDNW, the apparatuses can perform the wireless communication of the target data not via an access point (hereinafter referred to as "AP") configured separately from the apparatuses. That is, the WFD scheme can be considered a wireless communication scheme in which the AP is not used.

The G/O apparatus cannot perform the wireless communication of the target data with a device apparatus not belonging to the WFDNW but can perform the wireless communication of the data for connection with the device apparatus and establish connection to the device apparatus. Consequently, the G/O apparatus can cause the device apparatus to participate in the WFDNW.

Figure 2:
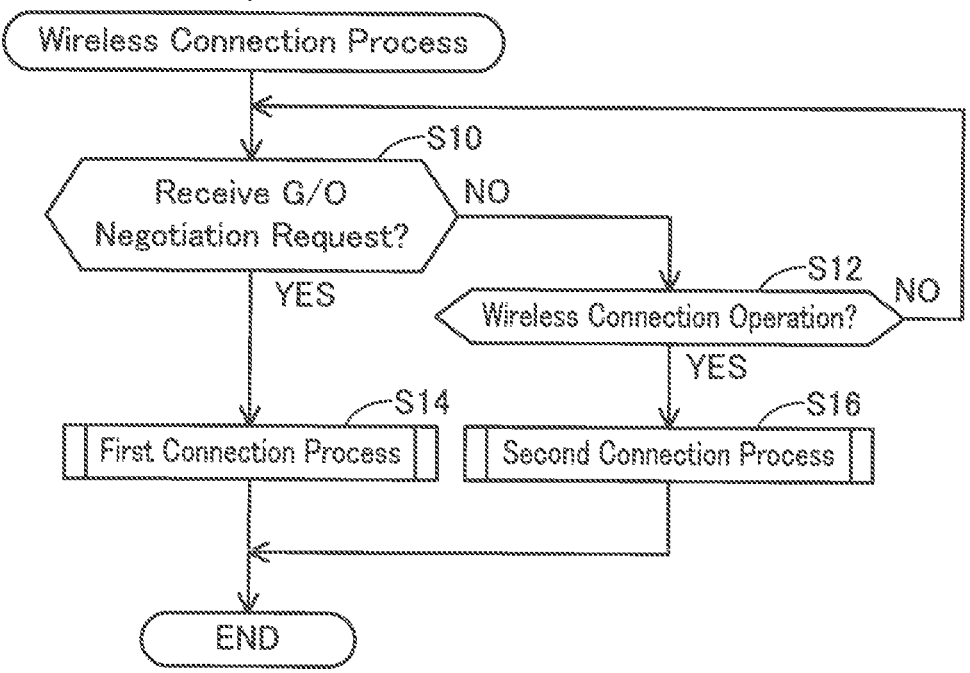
FIG. 2 shows a flowchart of a wireless connection process in a first embodiment.

(Wireless Connection Process; FIG. 2)

Subsequently, a wireless connection process executed by the CPU 22 of the printer 10 is explained with reference to FIG. 2. During power ON of the printer 10, the printer 10 is not connected to any wireless network and is in the device state of the WFD standard.

The CPU 22 repeatedly executes a monitoring process in S10 and monitoring process in S12 until the CPU 22 determines YES in S10 or S12. In S10, the CPU 22 monitors reception of a G/O negotiation Request from the terminal device 50 via the wireless LAN I/F 18. When receiving the G/O negotiation Request from the terminal device 50 in the device state, the CPU 22 determines YES in S10, and proceeds to S14. In S14, the CPU 22 executes a first connection process (see FIG. 3).

In S12, the CPU 22 monitors performing of a predetermined wireless connection operation in the operation unit 12. If the predetermined wireless communication operation is performed in the operation unit 12 by the user, the CPU 22 determines YES in S12 and proceeds to S16. In S16, the CPU 22 executes a second connection process (see FIG. 4).

Figure 3:
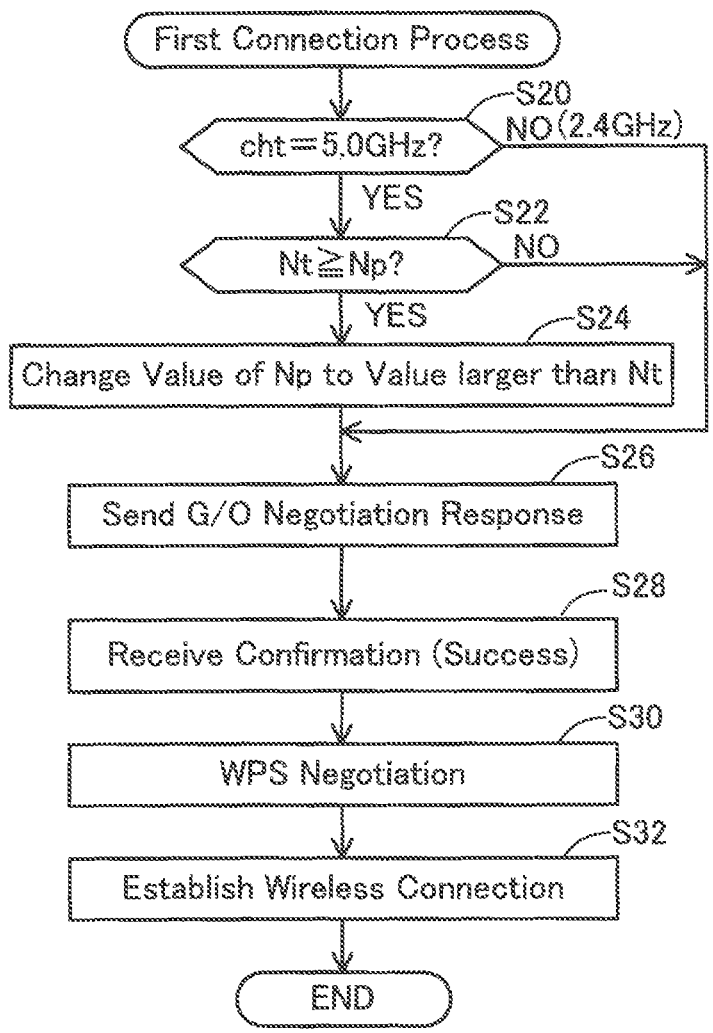
FIG. 3 shows a flowchart of a first connection process in the first embodiment.

(First Connection Process; FIG. 3)

Subsequently, the first connection process is explained with reference to FIG. 3. In S20, the CPU 22 determines whether the frequency band cht used when the terminal device 50 operates as the G/O apparatus of the WFDNW is the 5.0 GHz band. The G/O negotiation request received from the terminal device 50 includes related information related to the frequency band cht (i.e., one of the 5.0 GHz band and the 2.4 GHz band), which should be used when the terminal device 50 operates as the G/O apparatus of the WFDNW, and the INTENT value Nt set in the terminal device 50. Specifically, the related information indicates one of a plurality of channels that supports the frequency band cht. That is, in S20, the CPU 22 determines, by referring to the related information included in the G/O negotiation Request received from the terminal device 50, whether the frequency band cht is the 5.0 GHz band. If it is determined that the frequency band cht is the 5.0 GHz band, the CPU 22 determines YES in S20 and proceeds to S22. On the other hand, if it is determined that the frequency band cht is the 2.4

GHz band, the CPU 22 determines NO in S20 and proceeds to S26, skipping S22 and S24.

In S22, the CPU 22 determines whether the INTENT value Nt set in the terminal device 50 is equal to or larger than the INTENT value Np stored in the memory 24 (i.e., the INTENT value Np set in advance). If the INTENT value Nt is equal to or larger than the INTENT value Np, the CPU 22 determines YES in S22 and proceeds to S24. On the other hand, if the INTENT value Nt is smaller than the INTENT value Np, the CPU 22 determines NO in S22 and proceeds to S26 skipping S24.

In S24, the CPU 22 changes a value of the INTENT value Np to a value larger than the INTENT value Nt. The value of the INTENT value Np is changed in S24, whereby, it is determined in the G/O negotiation that the printer 10 changes to the G/O state and it is determined that the terminal device 50 changes to the CL state. Note that, as explained above, the frequency band used by the WFDNW is determined as the frequency band used by the G/O apparatus. A device having a larger INTENT value is the G/O apparatus. As explained above, the printer 10 is adapted to only 2.4 GHz. Therefore, if the terminal device 50 operates as the O/O apparatus, the printer 10 operates as the CL apparatus, and the WFDNW in which the frequency band of 5.0 GHz is used is formed, the printer 10 cannot perform communication using the WFDNW. Therefore, in this embodiment, in order to prevent occurrence of such a situation, the value of the INTENT value Np is changed in S24 to cause the printer 10 to operate as the G/O apparatus.

In the following S26, the CPU 22 sends a G/O negotiation Response to the terminal device 50 via the wireless LAN I/F 18. The G/O negotiation Response includes related information related to the frequency band chp (i.e., the 2.4 GHz band), which should be used when the printer 10 operates as the G/O apparatus of the WFDNW, and the INTENT value Np stored in the memory 24. Specifically, the related information indicates one of a plurality of channels that supports the frequency band chp. In the case of "NO" in S20 or S22, the INTENT value Np included in the G/O negotiation Response is the INTENT value Np stored in the memory 24 in advance. On the other hand, in the case of "YES" in S20 and S22, the INTENT value Np included in the G/O negotiation Response is the INTENT value Np after the change in S24.

In S28, the CPU 22 receives Confirmation (Success) from the terminal device 50 via the wireless LAN I/F 18. The Confirmation (Success) includes information indicating which of the printer 10 and the terminal device 50 is the G/O apparatus. When the CPU 22 ends the Confirmation (Success) in S28, the G/O negotiation ends.

If the Confirmation (Success) includes information indicating that the printer 10 is the G/O apparatus, the CPU 22 shifts a state of the printer 10 to the G/O state after the G/O negotiation ends (i.e., after S28). As a result, the printer 10 operates as the G/O apparatus. The CPU 22 forms the WFDNW in which the frequency band chp (i.e., the 2.4 GHz band) is used.

On the other hand, if the Confirmation (Success) includes information indicating that the terminal device 50 is the G/O apparatus, the CPU 22 shifts the state of the printer 10 to the CL state after the G/O negotiation ends (i.e., after S28). As a result, the printer 10 operates as the CL apparatus.

In S30, the CPU 22 executes the WPS negotiation between the CPU 22 and the terminal device 50 via the wireless LAN I/F 18. Specifically, the CPU 22 executes wireless communication of data for connection between the CPU 22 and the terminal device 50 via the wireless LAN I/F 18.

In the following S32, the CPU 22 establishes wireless connection with the terminal device 50 via the wireless LAN I/F 18. That is, if the printer 10 is the G/O apparatus, the printer 10 causes the terminal device 50 to participate as the CL apparatus in the WFDNW in which the printer 10 is the G/O apparatus. If the terminal device 50 is the G/O apparatus, the printer 10 participates as the CL apparatus in the WFDNW in which the terminal device 50 is the G/O apparatus. Consequently, the WFDNW to which both of the printer 10 and the terminal device 50 belong is formed. When S32 ends, the first connection process in FIG. 3 ends. If the INTENT value Np is changed in S24, the CPU 22 resets the value of the INTENT value Np to the value before the change after the ending of S32. When the first connection process (see S14 in FIG. 2) ends, the wireless connection process in FIG. 2 ends.

Figure 4:
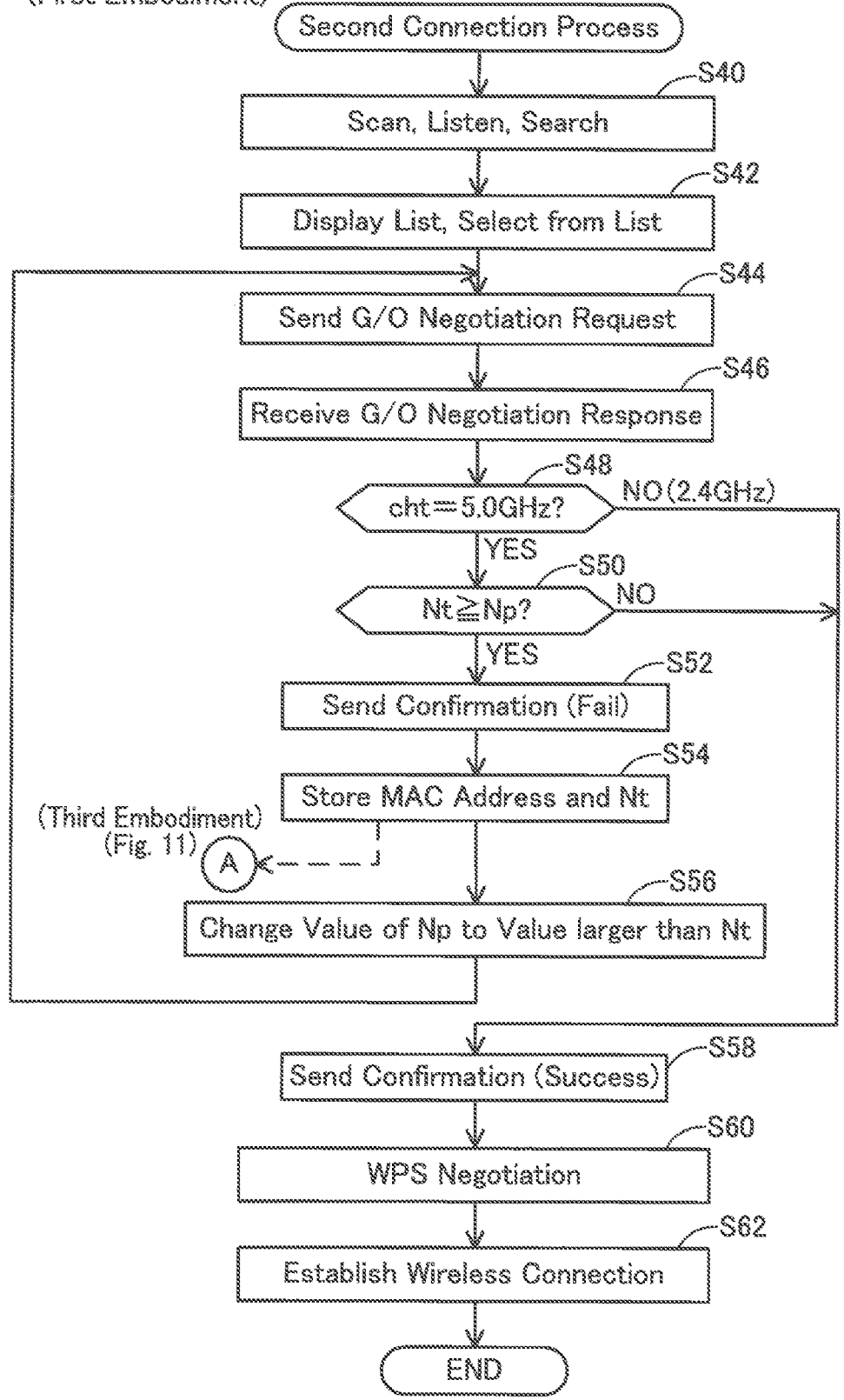
FIG. 4 shows a flowchart of a second connection process in the first embodiment.

(Second Connection Process; FIG. 4)

Subsequently, the second connection process is explained with reference to FIG. 4. When the predetermined wireless connection operation is performed in the operation unit 12, the CPU 22 sequentially executes respective kinds of process of Scan, Listen, and Search in S40. The Scan process is a process for sending a Probe Request signal and receiving a Probe Response signal to thereby find a G/O apparatus and an AP present around the printer 10. The Listen process is a process for receiving the Probe Request signal and sending the Probe Response signal to thereby inform the apparatus present around the printer 10 of a presence of the printer 10. The Search process is a process for sending the Probe Request signal and receiving the Probe Response signal to thereby find the device apparatus present around the printer 10.

Subsequently, in S42, the CPU 22 causes the display unit 14 to display an apparatus list indicating information concerning one or more apparatuses found in S40. The user operates the operation unit 12 and selects the terminal device 50 in the device state out of the apparatus list.

In S44, the CPU 22 sends a G/O negotiation Request to the terminal device 50 via the wireless LAN I/F 18. The G/O negotiation Request sent in S44 includes the related information (specifically, information indicating one of a plurality of channels that supports the frequency band clip) related to the frequency band chp (i.e., the 2.4 GHz band), which should be used when the printer 10 operates as the G/O apparatus of the WFDNW, and includes the INTENT value Np stored in the memory 24.

In S46, the CPU 22 receives a G/O negotiation Response from the terminal device 50 via the wireless LAN I/F 18. The G/O negotiation Response received in S46 includes the related information (specifically, information indicating one of a plurality of channels that supports the frequency band cht) related to the frequency band cht (i.e., one of the 2.4 GHz band and the 5.0 GHz band), which should be used when the terminal device 50 operates as the G/O apparatus of the WFDNW, and the INTENT value Nt set in the terminal device 50.

In S48, the CPU 22 determines whether the frequency band cht is the 5.0 GHz band. Specifically, in S48, the CPU 22 determines, by referring to the related information included in the G/O negotiation Response received from the terminal device 50, whether the frequency band cht is the 5.0 GHz band. If it is determined that the frequency band cht is the 5.0 GHz, the CPU 22 determines YES in S48 and proceeds to S50. On the other hand, if it is determined that the frequency band cht is the 2.4 GHz band, the CPU 22 determines NO in S48 and proceeds to S58.

In S50, the CPU 22 determines whether the INTENT value Nt set in the terminal device 50 is equal to or larger than the INTENT value Np stored in the memory 24. If the INTENT value Nt is equal to or larger than the INTENT value Np, the CPU 22 determines YES in S50 and proceeds to S52. On the other hand if the INTENT value Nt is smaller than the INTENT value Np, the CPU 22 determines NO in S50 and proceeds to S58.

In S52, the CPU 22 sends Confirmation (Fail) via the wireless LAN I/F 18. Consequently, formation of the WFDNW in which the terminal device 50 operates as the G/O apparatus and the 5.0 GHz band is used (i.e., the WFDNW in which the printer 10 cannot participate) is stopped.

In S54, the CPU 22 causes the memory 24 to store a MAC address of the terminal device 50 and the INTENT value Nt. The MAC address of the terminal device 50 has been included in the G/O negotiation Response received in S46.

In S56, the CPU 22 changes a value of the INTENT value Np to a value larger than a value of the INTENT Nt stored in the memory 24.

After ending S56, the CPU 22 returns to 844. In second 844, the CPU 22 sends a G/O negotiation Request to the MAC address of the terminal device 50 stored in S54 via the wireless LAN I/F 18. The G/O negotiation Request sent in this case includes the related information related to the frequency band chp and the INTENT value Np changed in S56.

In the following second 846, the CPU 22 receives a G/O negotiation Response from the terminal device 50. The G/O negotiation Response received at this occasion is the same as the G/O negotiation Response received in the first 846.

In the following second S48, the CPU 22 determines YES and proceeds to S50. In second 850, the CPU 22 determines whether the INTENT value Nt is equal to or larger than the INTENT value Np after the change. In S56, the value of the INTENT value Np was changed to the value larger than the value of the INTENT value Nt. Therefore, in second 850, the CPU 22 determines NO and proceeds to 858. In this case, it is determined that the printer 10 changes to the G/O state and it is determined that the terminal device 50 changes to the CL state.

In S58, the CPU 22 sends Confirmation (Success) to the terminal device 50 via the wireless LAN I/F 18. The Confirmation (Success) includes information indicating which of the printer 10 and the terminal device 50 is the G/O apparatus. When the CPU 22 ends the Confirmation (Success) in S58, the G/O negotiation ends.

If the Confirmation (Success) includes information indicating that the printer 10 is the G/O apparatus, the CPU 22 shifts the state of the printer 10 to the G/O state after the G/O negotiation ends (i.e., after S58). As a result, the printer 10 operates as the G/O apparatus. The CPU 22 forms the WFDNW in which the frequency band chp (i.e., the 2.4 GHz band) is used.

On the other hand, if the Confirmation (Success) includes information indicating that the terminal device 50 is the G/O apparatus, the CPU 22 shifts the state of the printer 10 to the CL state after the G/O negotiation ends (i.e., after S58). As a result, the printer 10 operates as the CL apparatus. When it is determined NO in S48 or S50, the printer 10 operates as the CL apparatus.

In S60, the CPU 22 executes the WPS negotiation between the CPU 22 and the terminal device 50 via the wireless LAN I/F 18. Specifically, the CPU 22 executes wireless communication of data for connection between the CPU 22 and the terminal device 50 via the wireless LAN I/F 18.

In the following S62, the CPU 22 establishes wireless connection to the terminal device 50 via the wireless LAN I/F 18. That is, if the printer 10 is the G/O apparatus, the printer 10 causes the terminal device 50 to participate as the CL apparatus in the WFDNW in which the printer 10 is the G/O apparatus. Similarly, if the terminal device 50 is the G/O apparatus, the printer 10 participates as the CL apparatus in the WFDNW in which the terminal device 50 is the O/O apparatus. Consequently, the WFDNW to which both of the printer 10 and the terminal device 50 belong is formed. When the CPU 22 ends S62, the second connection process in FIG. 4 ends. If the INTENT value Np was changed in S56, the CPU 22 resets the value of the INTENT value Np to the value before the change in S56, after ending S62. When the second connection process (see S16 in FIG. 2) ends, the wireless connection process in FIG. 2 ends.

(Specific Cases)

Subsequently, specific cases A1, A2, A3, and B1 in each of which wireless connection is established between the printer 10 and the terminal device 50 are explained with reference to FIGS. 5 to 8. The cases A1 to A3 and B1 are realized according to flowcharts of FIGS. 2 to 4. In the cases A1 to A3, the printer 10 receives a G/O negotiation Request from the terminal device 50 (see YES in S10 in FIG. 2) and executes the first connection process (see FIG. 3). In the case B1, a wireless connection operation is performed in the operation unit 12 of the terminal device 50 (in case of YES in S12 in FIG. 2) and the printer 10 executes the second connection process (see FIG. 4).

Figure 5:
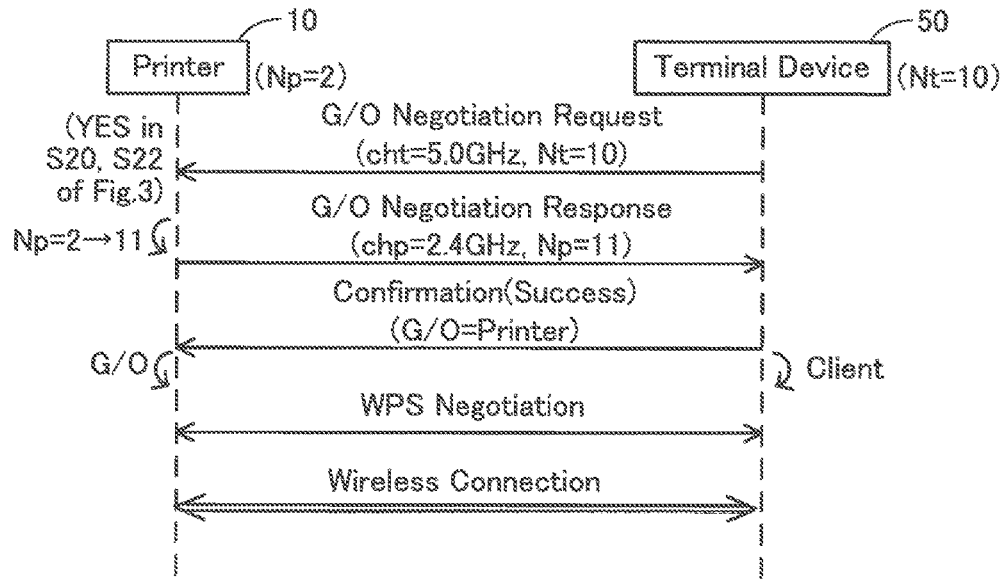
FIG. 5 shows a sequence chart of a wireless connection process (a case A1) in the first embodiment.

(Case A1; FIG. 5)

In an initial state of the case A1 in FIG. 5, the INTENT value Np "2" has been set in the printer 10 and the INTENT value Nt "10" has been set in the terminal device 50.

The terminal device 50 sends a G/O negotiation Request to the printer 10. The G/O negotiation Request includes related information related to frequency bend cht "the 5.0 GHz band" and the INTENT value Nt "10".

When receiving the G/O negotiation Request from the terminal device 50 (YES in S10 in FIG. 2), the printer 10 determines that the frequency band cht is the 5.0 GHz band (YES in S20 in FIG. 3). The printer 10 determines that the INTENT value Nt "10" is larger than the INTENT value Np "2" (YES in S22 in FIG. 3). Therefore, the printer 10 changes the value of the INTENT value Np to a value "11", which is larger than the INTENT value Nt (S24 in FIG. 3). Subsequently, the printer 10 sends a G/O negotiation Response to the terminal device 50 (S26 in FIG. 3). The G/O negotiation Response includes related information related to frequency chp "2.4 GHz band" and the INTENT value Np "11" after the change.

When receiving the G/O negotiation Response from the printer 10, the terminal device 50 compares the INTENT value Nt "10" and the INTENT value Np "11" and determines that the printer 10 is the G/O apparatus and the terminal device 50 is the CL apparatus. Subsequently, the terminal device 50 sends Confirmation (Success) to the printer 10. The Confirmation (Success) includes information indicating that the printer 10 is the G/O apparatus. After sending the Confirmation (Success), the terminal device 50 shifts to the CL state. That is, the terminal device 50 operates as the CL apparatus.

When receiving the Confirmation (Success) from the terminal device 50 (S28 in FIG. 3), the printer 10 shifts to the G/O state. That is, the printer 10 operates as the G/O apparatus. The printer 10 forms the WFDNW in which the frequency band chp (i.e., the 2.4 GHz band) is used.

Subsequently, the printer 10 executes the WPS negotiation between the printer 10 and the terminal device 50 (S30 in FIG. 3). That is, the printer 10 executes the wireless communication of data for connection between the printer 10 and the terminal device 50.

Subsequently, the printer 10 establishes wireless connection to the terminal device 50 (S32 in FIG. 3). That is, the printer 10 causes the terminal device 50 to participate as the CL apparatus in the WFDNW in which the printer 10 is the G/O apparatus. Consequently, the WFDNW to which both of the printer 10 and the terminal device 50 belong is formed.

As explained above, in the case A1, the printer 10 receives the G/O negotiation Request including the INTENT value Nt from the terminal device 50. When the printer 10 receives the G/O negotiation Request, the printer 10 can determine whether the frequency band cht is the 5.0 GHz band and the INTENT value Nt is equal to or larger than the INTENT value Np (see S20 and S22 in FIG. 3). Therefore, the printer 10 can change the value of the INTENT value Np, after receiving the G/O negotiation Request from the terminal device 50 and also before sending the G/O negotiation Response to the terminal device 50. The printer 10 can appropriately determine the printer 10 as the G/O apparatus while sending and receiving the G/O negotiation Request and Response.

Figure 6:
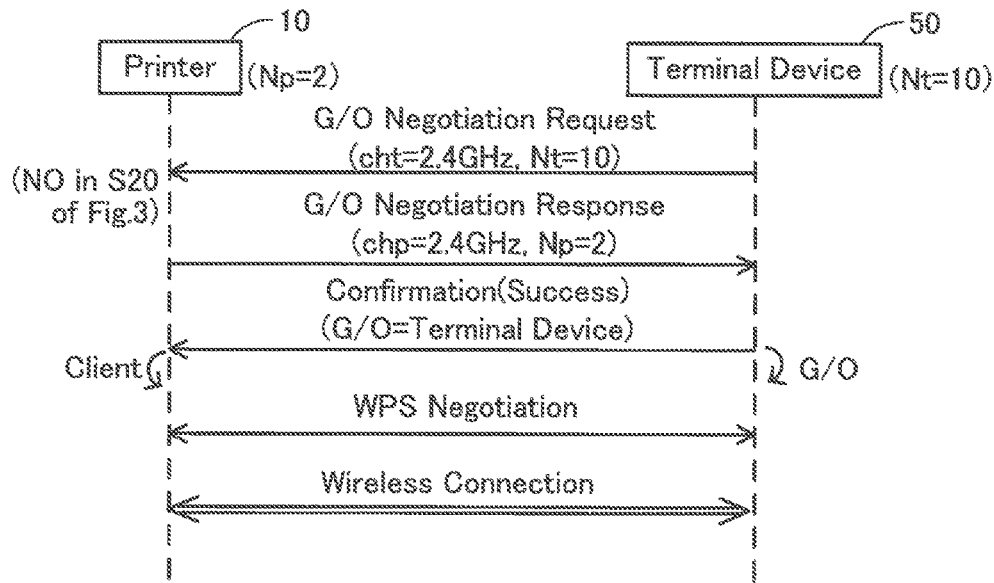
FIG. 6 shows a sequence chart of a wireless connection process (a case A2) in the first embodiment.

(Case A2; FIG. 6)

In an initial state of the Case A2 in FIG. 6 as well, the INTENT value "2" has been set in the printer 10 and the INTENT value Nt "10" has been set in the terminal device 50.

The terminal device 50 sends a G/O negotiation Request to the printer 10. In the case A2, the G/O negotiation Request includes related information related to the frequency band cht "the 2.4 GHz band" and the INTENT value Nt "10".

If the printer 10 receives the G/O negotiation Request from the terminal device 50 (YES in S10 in FIG. 2), the printer 10 determines that the frequency band cht is the 2.4 GHz band (NO in S20 in FIG. 3). Therefore, the printer 10 does not change the value of the INTENT value Np set in advance. Subsequently, the printer 10 sends a G/O negotiation Response to the terminal device 50 (S26 in FIG. 3). The G/O negotiation Response includes the related information related to the frequency band chp "the 2.4 GHz band" and the INTENT value Np "2" set in advance.

The terminal device 50 receives the G/O negotiation Response from the printer 10. The terminal device 50 compares the INTENT value Nt "10" and the INTENT value Np "2" and determines that the terminal device 50 is the G/O apparatus and the printer 10 is the CL apparatus. Subsequently, the terminal device 50 sends Confirmation (Success) to the printer 10. The Confirmation (Success) includes information indicating that the terminal device 50 is the G/O apparatus. After sending the Confirmation (Success), the terminal device 50 shifts to the G/O state. That is, the terminal device 50 operates as the G/O apparatus. The terminal device 50 forms the WFDNW in which the frequency band cht (i.e., the 2.4 GHz band) is used.

When receiving the Confirmation (Success) from the terminal device 50 (S28 in FIG. 3), the printer 10 shifts to the CL state. That is, the printer 10 operates as the CL apparatus.

Subsequently, the printer 10 executes the WPS negotiation between the printer 10 and the terminal device 50. That is, the printer 10 executes the wireless communication of data for connection between the printer 10 and the terminal device 50.

Subsequently, the printer 10 establishes wireless connection to the terminal device 50 (S32 in FIG. 3). That is, the printer 10 participates as the CL apparatus in the WFDNW in which the terminal device 50 is the G/O apparatus. Consequently, the WFDNW to which both of the printer 10 and the terminal device 50 belong is formed.

As explained above, in the case A2, if the frequency band cht is 2.4 GHz, the printer 10 can appropriately form, without changing the INTENT value Np of the printer 10, according to the INTENT value Np set in advance, the WFDNW to which both of the printer 10 and the terminal device 50 belong and in which the 2.4 GHz band is used.

Figure 7:
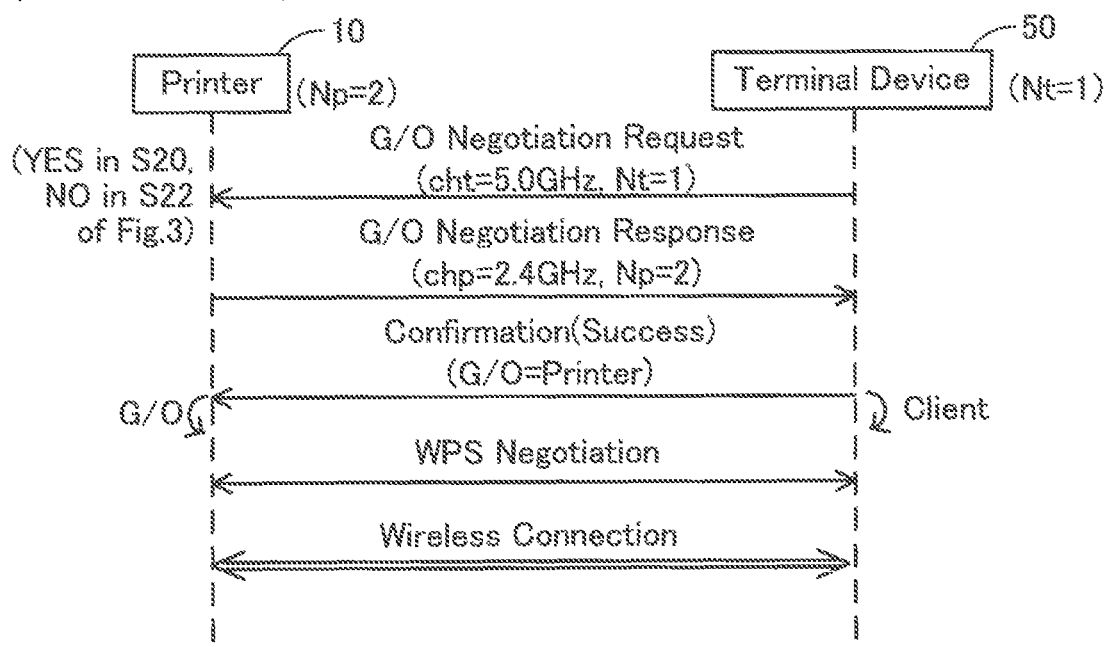
FIG. 7 shows a sequence chart of a wireless connection process (a case A3) in the first embodiment.

(Case A3; FIG. 7)

In an initial state of the case A3 in FIG. 7, the INTENT value Np "2" has been set in the printer 10 and the INTENT value Nt "1" has been set in the terminal device 50.

The terminal device 50 sends a G/O negotiation Request to the printer 10. In the case A3, the G/O negotiation Request includes related information related to the frequency band cht "the 5.0 GHz band" and the INTENT value Nt "1".

If the printer 10 receives the G/O negotiation Request from the terminal device 50 (YES in S10 in FIG. 2), the printer 10 determines that the frequency band cht is the 5.0 GHz band (YES in S20 in FIG. 3). Further, the printer 10 determines that the INTENT value Nt "1" is smaller than the INTENT value Np "2" (NO in S22 in FIG. 3). Therefore, the printer 10 does not change the value of the INTENT value Np set in advance. Subsequently, the printer 10 sends a G/O negotiation Response to the terminal device 50 (S26 in FIG. 3). The G/O negotiation Response includes related information related to the frequency band chp "the 2.4 GHz band" and the INTENT value Np "2".

The terminal device 50 receives a G/O negotiation Response from the printer 10. The terminal device 50 compares the INTENT value Nt "1" and the INTENT value Np "2" and determines that the printer 10 is the G/O apparatus and the terminal device 50 is the CL apparatus. Subsequently, the terminal device 50 sends Confirmation (Success) to the printer 10. The Confirmation (Success) includes information indicating that the printer 10 is the G/O apparatus. After sending the Confirmation (Success), the terminal device 50 shifts to the CL state. That is, the terminal device 50 operates as the CL apparatus.

When receiving the Confirmation (Success) from the terminal device 50 (S28 in FIG. 3), the printer 10 shifts to the G/O state. That is, the printer 10 operates as the G/O apparatus. The printer 10 forms the WFDNW in which the frequency band chp (i.e., the 2.4 GHz band) is used. Subsequently, the printer 10 executes the WPS negotiation between the printer 10 and the terminal device 50 (S30 in FIG. 3) and establishes wireless connection to the terminal device 50 (S32 in FIG. 3). That is, the printer 10 causes the terminal device 50 to participate as the CL apparatus in the WFDNW in which the printer 10 is the G/O apparatus. Consequently, the WFDNW to which both of the printer 10 and the terminal device 50 belong is formed.

As explained above, in the case A3, if the INTENT value Np set in advance is larger than the INTENT value Nt (NO in S22 in FIG. 3), namely, if the printer 10 is determined as being in the G/O state without changing the INTENT value Np, the printer 10 can appropriately form, according to the INTENT value Np set in advance in the printer 10 (or by sending a Probe Request including the INTENT value Np set in advance in the printer 10 to the terminal device 50), the WFDNW in which the printer 10 is the G/O apparatus and the frequency band chp (i.e., the 2.4 GHz band) is used.

Figure 8:
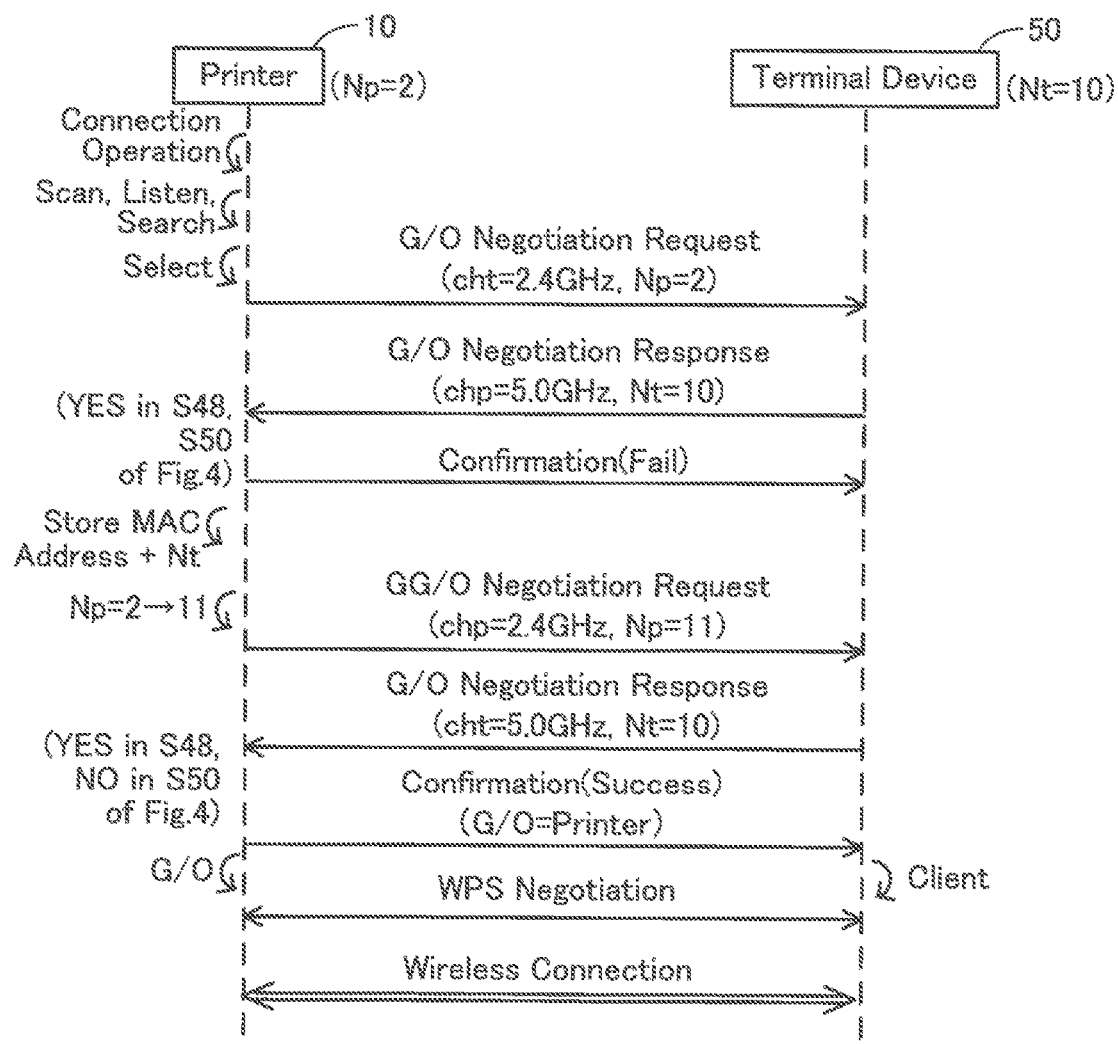
FIG. 8 shows a sequence chart of a wireless connection process (a case B1) in the first embodiment.

(Case B1; FIG. 8)

In an initial state of the case B1 in FIG. 8, the INTENT value Np "2" has been set in the printer 10 and the INTENT value Nt "10" has been set in the terminal device 50.

In the case B1, a predetermined wireless connection operation is performed in the operation unit 12 of the printer 10 (YES in S12 in FIG. 2). When the wireless connection operation is performed, the printer 10 sequentially executes respective kinds of process of Scan, Listen, and Search (S40 in FIG. 4). Next, the printer 10 causes the display unit 14 to display an apparatus list indicating apparatuses found by the Scan, the Listen, and the Search (S42 in FIG. 4). The user operates the operation unit 12 and selects the terminal device 50 in the device state out of the apparatus list (S42 in FIG. 4).

When the terminal device 50 is selected out of the apparatus list, the printer 10 sends a G/O negotiation Request to the terminal device 50 (S44 in FIG. 4). The G/O negotiation Request includes related information related to the frequency band chp "the 2.4 GHz band" and the INTENT value Np "2".

When receiving the G/O negotiation Request from the printer 10, the terminal device 50 sends a G/O negotiation Response to the printer 10. The G/O negotiation Response includes related information related to the frequency band cht "the 5.0 GHz band" and the INTENT value Nt "10".

When receiving the G/O negotiation Response from the terminal device 50 (S46 in FIG. 4), the printer 10 determines that the frequency band cht is the 5.0 GHz band (YES in S48 in FIG. 4). Further, the printer 10 determines that the INTENT value Nt "10" is larger than the INTENT value Np "2" (YES in S50 in FIG. 4). Therefore, the printer 10 sends Confirmation (Fail) to the terminal device 50 (S52 in FIG. 4). Consequently, formation of the WFDNW in which the terminal device 50 operates as the G/O apparatus and the 5.0 GHz band is used (i.e., the WFDNW in which the printer 10 cannot participate) is stopped.

Subsequently, the printer 10 causes the memory 24 to store a MAC address of the terminal device 50 and the INTENT value Nt (S54 in FIG. 4). The MAC address of the terminal device 50 and the INTENT value Nt have been included in the G/O negotiation Response. The printer 10 changes a value of the INTENT value Np to a value "11", which is larger than the INTENT value Nt (S56 in FIG. 4). The printer 10 sends the G/O negotiation Request again to the MAC address of the terminal device 50 stored in the memory 24 (S44 in FIG. 4). The G/O negotiation Request includes related information related to the frequency band chp "the 2.4 GHz band" and the INTENT value Np "11" after the change.

When receiving the G/O negotiation Request from the printer 10, the terminal device 50 sends a G/O negotiation Response to the printer 10. The G/O negotiation Response includes related information related to the frequency band cht "the 5.0 GHz band" and the INTENT value Nt "10".

When receiving the G/O negotiation Response from the terminal device 50 (S46 in FIG. 4), the printer 10 determines that the frequency band cht is the 5.0 GHz band (YES in S48 in FIG. 4). The printer 10 determines that the INTENT value Vp "11" after the change is larger than the INTENT value Nt "10" (NO in S50 in FIG. 4). Therefore, the printer 10 determines that the printer 10 is the G/O apparatus and the terminal device 50 is the CL apparatus.

Subsequently, the printer 10 sends Confirmation (Success) to the terminal device 50. The Confirmation (Success) includes information indicating that the printer 10 is the G/O apparatus. After sending the Confirmation (Success) to the terminal device 50, the printer 10 shifts to the G/O state and operates as the G/O apparatus. The printer 10 forms the WFDNW in which the frequency band chp (i.e., the 2.4 GHz band) is used.

When receiving the Confirmation (Success), the terminal device 50 shifts to the CL state and operates as the CL apparatus.

The printer 10 executes the WPS negotiation between the printer 10 and the terminal device 50 (S60 in FIG. 4). That is, the printer 10 executes wireless communication of data for connection between the printer 10 and the terminal device 50.

Subsequently, the printer 10 establishes wireless connection to the terminal device 50 (S62 in FIG. 4). That is, the printer 10 causes the terminal device 50 to participate as the CL apparatus in the WFDNW in which the printer 10 is the G/O apparatus. Consequently, the WFDNW to which both of the printer 10 and the terminal device 50 belong is formed.

As explained above, in the case B1, after sending the Confirmation (Fail) to the terminal device 50, the printer 10 can appropriately form the WFDNW in which the printer 10 and the terminal device 50 are included and the 2.4 GHz band different from the 5.0 GHz band should be used.

(Effects of the First Embodiment)

As explained above, in this embodiment, if it is determined that the frequency band cht is 5.0 GHz (YES in S20 in FIG. 3 and YES in S48 in FIG. 4) and it is determined that the INTENT value Nt is equal to or larger than the INTENT value Np (YES in S22 in FIG. 3 and YES in S50 in FIG. 4), the printer 10 operates as the G/O apparatus, causes the terminal device 50 to operate as the CL apparatus, and forms the WFDNW in which the printer 10 and the terminal device 50 are included and the 2.4 GHz band different from the 5.0 GHz band should be used (S32 in FIG. 3 and S62 in FIG. 4). Therefore, when the WFDNW including the printer 10 and the terminal device 50 should be formed, the printer 10 may appropriately form the WFDNW.

In this embodiment, the printer 10 is adapted to only the 2.4 GHz band and is not adapted to the 5.0 GHz band. With the technique in this embodiment, even when it is determined that the frequency band cht is 5.0 GHz and it is determined that the INTENT value Vt is equal to or larger than the INTENT value Np, it is possible to prevent the formation of the WFDNW in which the 5.0 GHz band, to which the printer 10 is not adapted, is used. Therefore, when the WFDNW including the printer 10 and the terminal device 50 should be formed, the printer 10 may appropriately form the WFDNW.

(Correspondence Relation)

The printer 10 is an example of "wireless communication apparatus". The wireless LAN I/F 18 is an example of "wireless communication interface". The 5.0 GHz band and the 2.4 GHz band are respectively examples of "first frequency band" and "second frequency band". The WFDNW is an example of "specific wireless network". The G/O apparatus and the CL apparatus are respectively examples of "parent station" and "child station". The WFDNW in which the terminal device 50 operates as the G/O apparatus and the printer 10 operates as the CL apparatus is an example of "first wireless network". The WFDNW in which the printer 10 operates as the G/O apparatus and the terminal device 50 operates as the CL apparatus is an example of "second wireless network". The G/O negotiation Request received in the case of YES in S10 in FIG. 2 and the G/O negotiation Response received in S46 in FIG. 4 are examples of "signal for forming a specific wireless network". The frequency band cht is an example of "a frequency band that should be used in the first wireless network". The INTENT value Nt and the INTENT value Np are respectively examples of "terminal index value" and "apparatus index value". The INTENT value Np after the change is an example of "specific index value". The case of YES in S20 and S22 in FIG. 3 and the case of YES in S48 and S50 in FIG. 4 are examples of "first case". The G/O negotiation Request received in the case of YES in S10 in FIG. 2 is an example of "request signal". The G/O negotiation Response sent in S26 in FIG. 3 is an example of "response signal". The case of NO in S22 in FIG. 3 and the case of NO in S50 in FIG. 4 are examples of "second case". The case of NO in S20 in FIG. 3 and the case of NO in S48 in FIG. 4 are examples of "third case".

The process in the case of YES in S10 in FIG. 2 and the process in S46 in FIG. 4 are examples of "receiving". The determination in S20 in FIG. 3 and the determination in S48 in FIG. 4 are examples of "determining whether the related information is related to a first frequency band". The determination in S22 in FIG. 3 and the determination in S50 in FIG. 4 are examples of "determining, . . . , whether or not the terminal device is more likely to become the parent station than the wireless communication apparatus". The process in S32 in the case of YES in S20 and S22 in FIG. 3 and the process in S62 in the case of YES in S48 and S50 in FIG. 4 are examples of "forming a second wireless network . . . ". The process in S26 in the case of YES in S20 and S22 in FIG. 3 is an example of "sending, in the first case, the response signal including a specific index value different from the apparatus index value to the terminal device, . . . ". The process in S26 in the case of NO in S22 in FIG. 3 is an example of "sending, in a second case where it is determined that the wireless communication apparatus is more likely to become the parent station than the terminal device, the response signal including the apparatus index value to the terminal device". The process in S26 in the case of NO in S20 in FIG. 3 is an example of "sending the response signal including the apparatus index value to the terminal device, in a third case where it is determined that the related information is not related to the first frequency band due to the related information being related to the second frequency band,".

(Second Embodiment)

Differences from the first embodiment are explained. In this embodiment, contents of a second connection process executed by the CPU 22 of the printer 10 are different from the contents of the second connection process in the first embodiment. That is, this embodiment is different from the first embodiment in that, after sending Confirmation (Fail) to the terminal device 50, the CPU 22 autonomously shifts to the G/O state and establishes wireless connection to the terminal device 50 (In other words, the printer becomes autonomous G/O).

Figure 9:
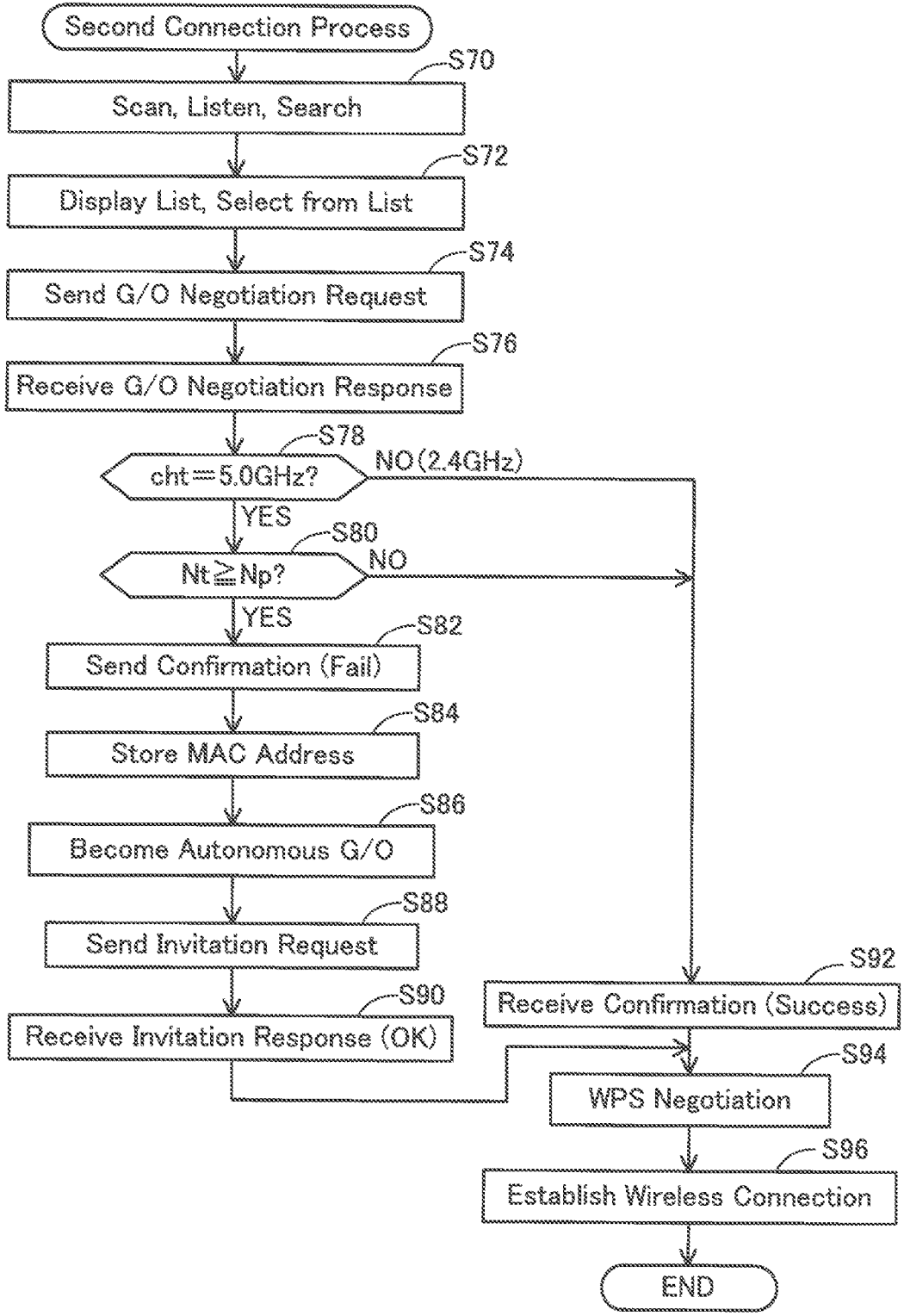
FIG. 9 shows a flowchart of a second connection process in a second embodiment.

(Second Connection Process; FIG. 9)

The second connection process in this embodiment is explained with reference to FIG. 9. When the predetermined wireless connection operation is performed in the operation unit 12, the CPU 22 sequentially executes kinds of processes in S70, S72, S74, and S76. Contents of the processes in S70 to S76 are the same as the contents of the the processes in S40 to S46 in FIG. 4. Therefore, detailed explanation of the processes is omitted.

Subsequently, the CPU 22 executes determinations in S78 and S80. Contents of the determinations in S78 and S0 are the same as the contents of the determinations in S48 and S50 in FIG. 4. Therefore, detailed explanation of the determinations is omitted. In the case of YES in S78, the CPU 22 proceeds to S80. In the case of YES in S80, the CPU 22 proceeds to S82. On the other hand, in the case of NO in S78 or S80, the CPU 22 proceeds to S92. Contents of the processes in S92, S94, and S96 are the same as the contents of the processes in S58, S60, and S62 in FIG. 4. Therefore, detailed explanation of the processes is omitted.

In S82, the CPU 22 sends Confirmation (Fail) via the wireless LAN I/F 18. Consequently, formation of the WFDNW in which the terminal device 50 operates as the G/O apparatus and the 5.0 GHz band is used (i.e., the WFDNW in which the printer 10 cannot participate), is stopped.

In S84, the CPU 22 causes the memory 24 to store a MAC address of the terminal device 50. The MAC address of the terminal device 50 has been included in the G/O negotiation Response received in S76.

In S86, the CPU 22 autonomously shifts the state of the printer 10 to the G/O state. As a result, the printer 10 operates as the G/O apparatus. The CPU 22 forms the WFDNW in which the frequency band chp (i.e., the 2.4 GHz band) is used.

In S88, the CPU 22 sends an Invitation Request to the MAC address of the terminal device 50 stored in S84 via the wireless LAN I/F 18. The Invitation Request is a request signal for causing the terminal device 50 to participate as the CL apparatus in the WFDNW formed by the printer 10, which is the G/O apparatus.

In S90, the CPU 22 receives an Invitation Response (OK) from the terminal device 50 via the wireless LAN I/F 18. The Invitation Response (OK) is a response signal indicating that the terminal device 50 participates as the CL apparatus in the WFDNW formed by the printer 10, which is the G/O apparatus. After ending S90, the CPU 22 proceeds to S94.

In S94, the CPU 22 executes the WPS negotiation between the CPU 22 and the terminal device 50 via the wireless LAN I/F 18. Specifically, the CPU 22 executes wireless communication of data for connection between the CPU 22 and the terminal device 50 via the wireless LAN I/F 18.

In the following S96, the CPU 22 establishes wireless connection to the terminal device 50 via the wireless LAN I/F 18. That is, the printer 10 causes the terminal device 50 to participate as the CL apparatus in the WFDNW in which the printer 10 is the G/O apparatus. Consequently, the WFDNW to which both of the printer 10 and the terminal device 50 belong is formed. When the CPU 22 ends S96, the second connection process in FIG. 9 ends.

Figure 10:
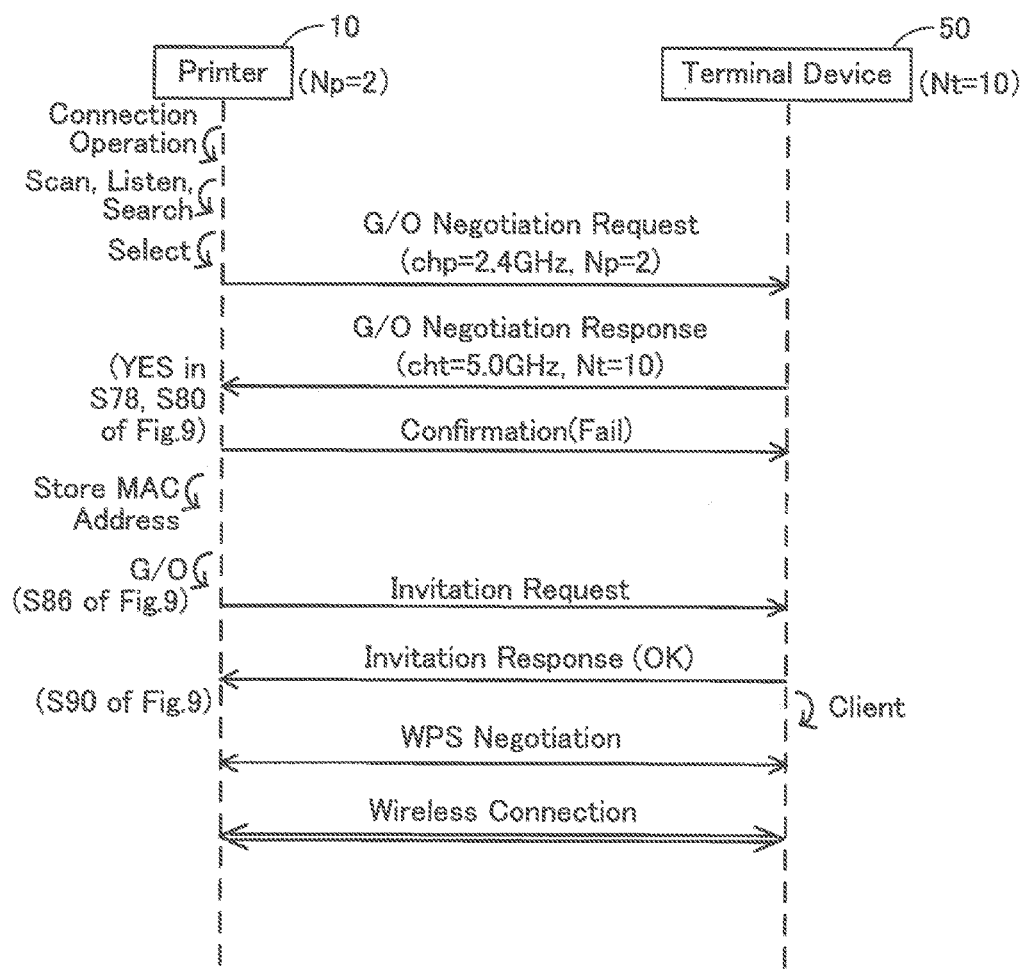
FIG. 10 shows a sequence chart of a wireless connection process (a case B2) in the second embodiment.

(Specific Case; Case B2; FIG. 10)

Subsequently, a specific case of this embodiment is explained with reference to FIG. 10. In an initial state of the case B2 in FIG. 10, the INTENT value Np "2" has been set in the printer 10 and the INTENT value Nt "10" has been set in the terminal device 50.

In the case B2 as well, the predetermined wireless connection operation is performed in the operation unit 12 of the printer 10 (YES in S12 in FIG. 2). When the wireless connection operation is performed, the printer 10 sequentially executes the respective kinds of process of Scan, Listen, and Search (S70 in FIG. 9). The printer 10 causes the display unit 14 to display an apparatus list indicating apparatuses found by the Scan, the Listen, and the Search (S72 in FIG. 9). The user operates the operation unit 12 and selects the terminal device 50 in the device state out of the apparatus list (S72 in FIG. 9).

When the terminal device 50 is selected out of the apparatus list, the printer 10 sends a G/O negotiation Request to the terminal device 50 (S74 in FIG. 9). The G/O negotiation Request includes related information related to the frequency band chp "the 2.4 GHz band" and the INTENT value Np "2".

When receiving the G/O negotiation Request from the printer 10, the terminal device 50 sends a G/O negotiation Response to the printer 10. The G/O negotiation Response includes related information related to the frequency bend cht "5.0 GHz band" and the INTENT value Nt "10".

When receiving the G/O negotiation Response from the terminal device 50 (S76 in FIG. 9), the printer 10 determines that the frequency band cht is the 5.0 GHz band (YES in S78 in FIG. 9). Further, the printer 10 determines that the INTENT value Nt "10" is larger than the INTENT value Np "2" (YES in S80 in FIG. 9). Therefore, the printer 10 sends Confirmation (Fail) to the terminal device 50 (S82 in FIG. 9). Consequently, formation of the WFDNW in which the terminal device 50 operates as the G/O apparatus and the 5.0 GHz band is used (i.e., the WFDNW in which the printer 10 cannot participate) is stopped.

Subsequently, the printer 10 causes the memory 24 to store a MAC address of the terminal device 50 (S84 in FIG. 9). The printer 10 autonomously shifts to the G/O state. As a result, the printer 10 operates as the G/O apparatus. The printer 10 forms the WFDNW in which the frequency band chp (i.e., the 2.4 GHz band) is used.

Subsequently, the printer 10 sends an Invitation Request to the MAC address of the terminal device 50 stored in the memory 24 (S88 in FIG. 9).

When receiving the Invitation Request from the printer 10, the terminal device 50 sends an Invitation Response (OK) to the printer 10. After sending the Invitation Response (OK) to the printer 10, the terminal device 50 shifts to the CL state. Consequently, the terminal device 50 operates as the CL apparatus.

When receiving the Invitation Response (OK) from the terminal device 50 (S90 in FIG. 9), the printer 10 executes the WPS negotiation between the printer 10 and the terminal device 50 (S94 in FIG. 9). That is, the printer 10 executes wireless communication of data for connection between the printer 10 and the terminal device 50.

Subsequently, the printer 10 establishes wireless connection to the terminal device 50 (S96 in FIG. 9). That is, the printer 10 causes the terminal device 50 to participate as the CL apparatus in the WFDNW in which the printer 10 is the G/O apparatus. Consequently, the WFDNW to which both of the printer 10 and the terminal device 50 belong is formed.

(Effects of the Second Embodiment)

As explained above, in this embodiment, after the Confirmation (Fail) is sent (S82 in FIG. 4), the printer 10 autonomously operates as the G/O apparatus (S86 in FIG. 4) and forms the WFDNW in which the 2.4 GHz band is used. Thereafter, the printer 10 sends the Invitation Request to the terminal device 50 and causes the terminal device 50 to participate in the WFDNW. Consequently, the printer 10 can form the WFDNW in which the printer 10 and the terminal device 50 are included. Therefore, the printer 10 can appropriately form the WFDNW in this embodiment as well.

(Correspondence Relation)

The case of YES in S78 and S80 in FIG. 9 is an example of "first case". The case of NO in S80 in FIG. 9 is an example of "second case". The case of NO in S78 in FIG. 9 is an example of "third case".

(Third Embodiment)

Differences from the first embodiment are mainly explained. In this embodiment as well, contents of the second connection process executed by the CPU 22 of the printer 10 are different from the contents of the second connection process in the first embodiment. That is, this embodiment is different from the first embodiment in that, after sending the Confirmation (Fail) to the terminal device 50, the CPU 22 receives a G/O negotiation Request from an external device.

Figure 11:
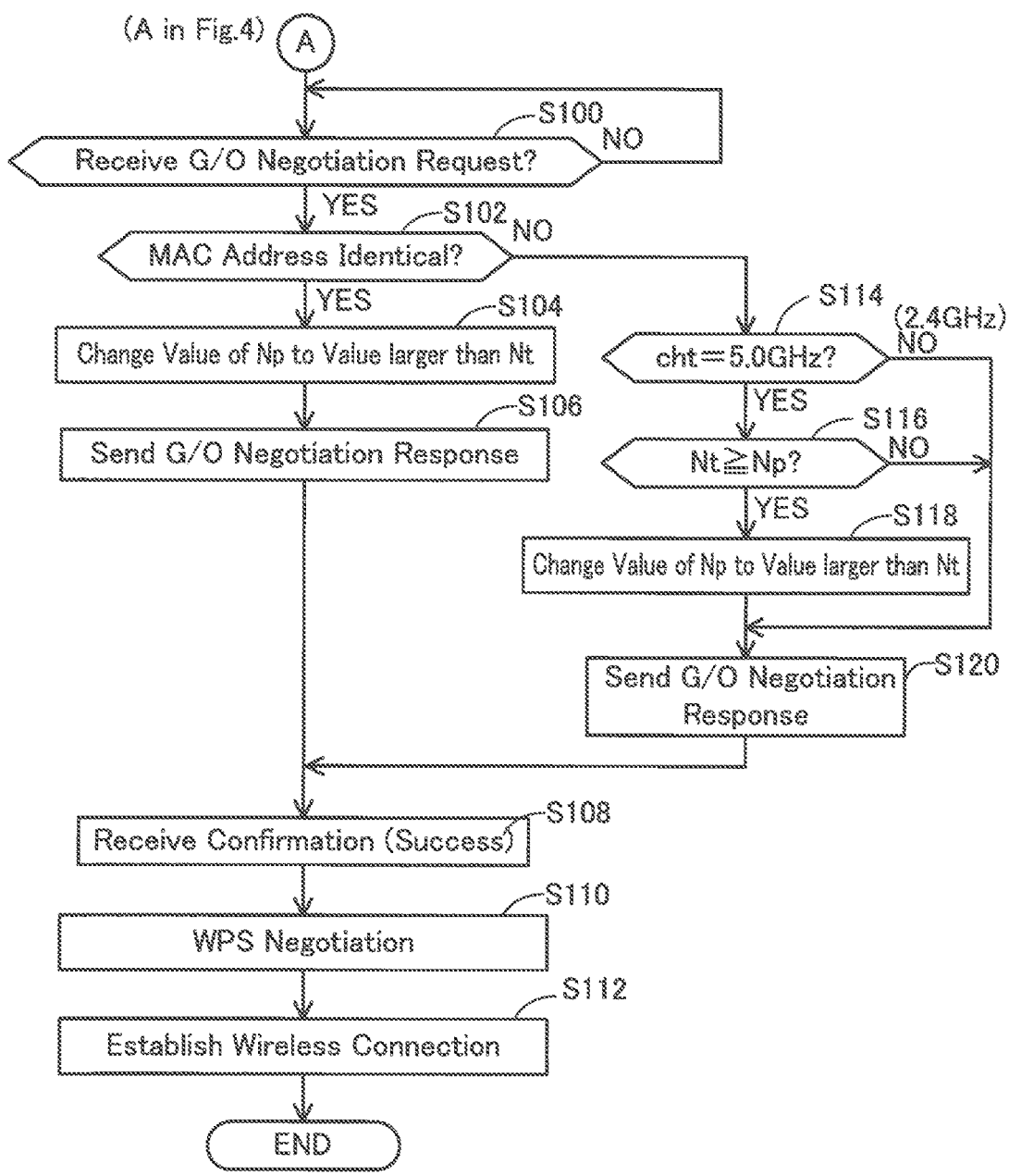
FIG. 11 shows a flowchart of a second connection process in a third embodiment.

(Second Connection Process; FIGS. 4 and 11)

The second connection process in this embodiment is explained with reference to FIGS. 4 and 11. As shown in FIG. 4, in this embodiment as well, when the predetermined wireless connection operation is performed in the operation unit 12, similarly to the first embodiment, the CPU 22 executes the processes in S40 to S54 in FIG. 4. In the case of NO in S48 or S50, similarly to the first embodiment, the CPU 22 executes the processes in S58 to S62.

This embodiment is different from the first embodiment in that, the CPU 22 proceeds to S100 in FIG. 11 after causing, in S54, the memory 24 to store the MAC address of the terminal device 50 and the INTENT value Nt set in the terminal device 50.

In S100 in FIG. 11, the CPU 22 monitors reception of a G/O negotiation Request. When receiving the G/O negotiation Request from the external device in the device state via the wireless LAN I/F 18, the CPU 22 determines YES in S100 and proceeds to S102.

In S102, the CPU 22 determines whether a MAC address of a transmission source of the received G/O negotiation Request (i.e., a MAC address included in the G/O negotiation Request) and the MAC address of the terminal device 50 stored in the memory 24 in S54 in FIG. 4 are identical with each other. If the MAC address of the transmission source of the G/O negotiation Request and the MAC address of the terminal device 50 stored in the memory 24 are identical with each other, the CPU 22 determines YES in S102 and proceeds to S104. In this case, the transmission source of the G/O negotiation Request is the terminal device 50. On the other hand, if the MAC address of the transmission source of the G/O negotiation Request and the MAC address of the terminal device 50 stored in the memory 24 are different, the CPU 22 determines NO in S102 and proceeds to S114.

In S104, the CPU 22 changes a value of the INTENT value Np to a value larger than the value of the INTENT value Np stored in the memory 24. Since the value of the INTENT value Np is changed in S104, it is determined that the printer 10 changes to the G/O state and the terminal device 50 changes to the CL state.

In S106, the CPU 22 sends a G/O negotiation Response to the terminal device 50 via the wireless LAN I/F 18. The G/O negotiation Response includes the related information related to the frequency band chp (i.e., 2.4 GHz) and the INTENT value Np after the change. After ending S106, the CPU 22 proceeds to S108.

Processes in S114, S116, S118, and S120 are the same as processes in S20, S22, S24, and S26 in FIG. 3. Therefore, detailed explanation of the processes is omitted. After ending S120, the CPU 22 proceeds to S108.

Processes in S108, S110, and S112 are the same as the processes in S58, S60, and S62 in FIG. 4. Therefore, detailed explanation of the processes is omitted. When the CPU 22 ends SI 12, the WFDNW to which both of the printer 10 and the terminal device 50 belong is formed. When the CPU 22 ends S112, the second connection process in FIGS. 4 and 11 ends. If the INTENT value Np was changed in S104 or S118, after ending S112, the CPU 22 resets the value of the INTENT value Np to the value before the change.

Figure 12:
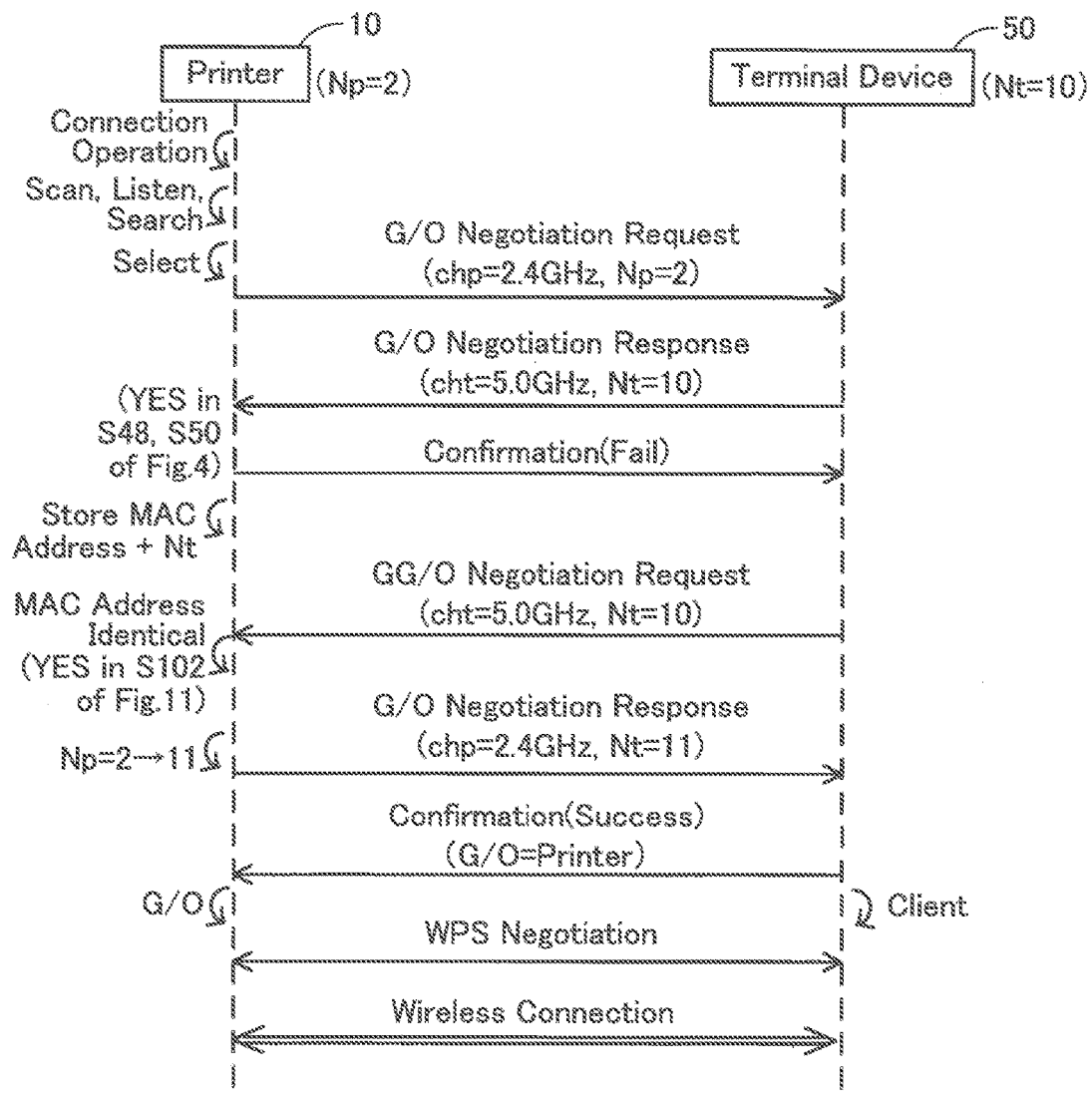
FIG. 12 shows a sequence chart of a wireless connection process (a case B3) in the third embodiment.

(Specific Case; Case B3; FIG. 12)

Subsequently, a specific case in this embodiment is explained with reference to FIG. 12. In an initial state of the case B3 in FIG. 12, the INTENT value Np "2" has been set in the printer 10 and the INTENT value Nt "10" has been set in the terminal device 50.

In the case B3 as well, the predetermined wireless connection operation is performed in the operation unit 12 of the printer 10 (YES in S12 in FIG. 2). When the wireless connection operation is performed, the printer 10 sequentially executes the respective kinds of process of Scan, Listen, and Search (S40 in FIG. 4). The printer 10 causes the display unit 14 to display an apparatus list indicating apparatuses found by the Scan, the Listen, and the Search (S42 in FIG. 4). The user operates the operation unit 12 and selects the terminal device 50 in the device state out of the apparatus list (S42 in FIG. 4).

When the terminal device 50 is selected out of the apparatus list, the printer 10 sends a G/O negotiation Request to the terminal device 50 (S44 in FIG. 4). The G/O negotiation Request includes related information related to the frequency band chp "the 2.4 GHz band" and the INTENT value Np "2".

When receiving the G/O negotiation Request from the printer 10, the terminal device 50 sends a G/O negotiation Response to the printer 10. The G/O negotiation Response includes related information related to the frequency band cht "the 5.0 GHz band" and the INTENT value Nt "10".

When receiving the G/O negotiation Response from the terminal device 50 (S46 in FIG. 4), the printer 10 determines that the frequency band cht is the 5.0 GHz band (YES in S48 in FIG. 4). The printer 10 determines that the INTENT value Nt "10" is larger than the INTENT value Np "2" (YES in S50 in FIG. 4). Therefore, the printer 10 sends Confirmation (Fail) to the terminal device 50 (S52 in FIG. 4). Consequently, formation of the WFDNW in which the terminal device 50 operates as the G/O apparatus and the 5.0 GHz band is used (i.e., the WFDNW in which the printer 10 cannot participate) is stopped.

Subsequently, the printer 10 causes the memory 24 to store the MAC address of the terminal device 50 and the INTENT value Nt (S54 in FIG. 4). Further, the printer 10 monitors reception of a G/O negotiation Request from another device (S100 in FIG. 11).

When receiving the Confirmation (Fail) from the printer 10, the terminal device 50 sends a G/O negotiation Request to the printer 10. For example, if the terminal device 50 includes a so-called retry function, the terminal device 50 automatically sends the G/O negotiation Request to the printer 10 upon receiving the Confirmation (Fail) from the printer 10. The G/O negotiation Request includes related information related to the frequency band cht "5.0 GHz" and the INTENT value Nt "10".

When receiving the G/O negotiation Request from the terminal device 50 (YES in S100 in FIG. 11), the printer 10 determines that a MAC address of a transmission source of the G/O negotiation Request and the MAC address of the terminal device 50 stored in the memory 24 are identical with each other (YES in S102 in FIG. 11). Next, the printer 10 changes the value of the INTENT value Np to a value "11" larger than the INTENT value Nt (S104 in FIG. 11). The printer 10 sends a G/O negotiation Response to the terminal device 50 (S106 in FIG. 11). The G/O negotiation Response includes related information related to the frequency band chp "the 2.4 GHz band" and the INTENT value Np "11" after the change.

When receiving the G/O negotiation Response from the printer 10, the terminal device 50 compares the INTENT value Nt "10" and the INTENT value Np "11" and determines that the printer 10 is the G/O apparatus and the terminal device 50 is the CL apparatus. Subsequently, the terminal device 50 sends Confirmation (Success) to the printer 10. The Confirmation (Success) includes information indicating that the printer 10 is the G/O apparatus. After sending the Confirmation (Success), the terminal device 50 shifts to the CL state. That is, the terminal device 50 operates as the CL apparatus.

When receiving the Confirmation (Success) from the terminal device 50 (S108 in FIG. 11), the printer 10 shifts to the G/O state and operates as the G/O apparatus. The printer 10 forms the WFDNW in which the frequency band chp (i.e., the 2.4 GHz band) is used.

Subsequently, the printer 10 executes a WPS negotiation between the printer 10 and the terminal device 50 (S110 in FIG. 11). The printer 10 establishes wireless connection to the terminal device 50 (S112 in FIG. 11). That is, the printer 10 causes the terminal device 50 to participate as the CL apparatus in the WFDNW in which the printer 10 is the G/O apparatus. Consequently, the WFDNW to which both of the printer 10 and the terminal device 50 belong is formed.

(Effects of the Third Embodiment)

As explained above, in this embodiment, after sending the Confirmation(Fail), the printer 10 receives the G/O negotiation Request from the other device (YES in S100 in FIG. 11). If the MAC address of the terminal device 50 stored in the memory 24 and the MAC address of the transmission source of the G/O negotiation Request are identical with each other (YES in S102 in FIG. 11), the printer 10 can send the G/O negotiation Response including the INTENT value Np after the change, to the terminal device 50 (S106 in FIG. 11). Thereafter, the printer 10 operates as the G/O apparatus, causes the terminal device 50 to operate as the CL apparatus, and forms the WFDNW in which the printer 10 and the terminal device 50 are included and the 2.4 GHz band different from the 5.0 GHz band should be used (S122 in FIG. 11). Therefore, in this embodiment as well, the printer 10 may appropriately form the WFDNW.

The specific examples of the present invention are explained in detail above. However, the specific examples are only illustrations and do not limit the scope of claims. Techniques described in the scope of claims include various modifications and alterations of the illustrated specific examples. Modifications of the embodiments are enumerated below.

(Modification 1) In the cases explained above, when the value of the INTENT value Np is changed to the value larger than the value of the INTENT value Nt, the CPU 22 of the printer 10 changes the value of the INTENT value Np to a value ("11") larger than the value of the INTENT value Nt by 1 (see FIGS. 5, 8, and 12). A degree of the change when the value of the INTENT value Np is changed to the value larger than the value of the INTENT value Nt, is not only limited to 1, and the CPU 22 of the printer 10 may change the INTENT value Np to a maximum value "15".

(Modification 2) In the embodiments explained above, the INTENT value is used as the index value indicating a degree that a device apparatus should be the G/O. However, the index value indicating the degree that the device apparatus should be the G/O is not limited to the INTENT value and may be any other index value.

(Modification 3) In the embodiments explained above, the CPU 22 of the printer 10 determines whether the frequency band cht is the 5.0 GHz band (S20 in FIG. 3, S48 in FIG. 4, and S78 in FIG. 9) before determining whether the INTENT value Nt is equal to or larger than the INTENT value Np (S22 in FIG. 3, S50 in FIG. 4, and S80 in FIG. 9). However, the order of the determinations may be opposite.

(Modification 4) The printer 10 may further include, in addition to the printing function, a scan function, a FAX function, and a telephone function.

(Modification 5) In the embodiments explained above, the CPU 22 of the printer 10 executes a computer program (i.e., software), whereby the processes in FIGS. 2 to 12 are realized. Instead of the computer program, at least one process among the processes in FIGS. 2 to 12 may be realized by hardware such as a logic circuit.

What is claimed is:

1. A wireless communication apparatus comprising:
   a wireless communication interface;
   a processor; and
   a memory storing computer-readable instructions therein, the computer-readable instructions, when executed by the processor, causing the wireless communication apparatus to perform:
   receiving, from a terminal device, a signal for forming a specific wireless network including the wireless communication apparatus and the terminal device, the specific wireless network being either of a first wireless network or a second wireless network, the first wireless network being a network in which the terminal device operates as a parent station and the wireless communication apparatus operates as a child station, the second wireless network being a network in which the wireless communication apparatus operates as the parent station and the terminal device operates as the child station, the signal including related information specifying a frequency band to be used in the first wireless network and a terminal index value being set in advance in the terminal device, wherein the terminal device supports both a first frequency band not supported by the wireless communication interface of the wireless communication apparatus and a second frequency band supported by the wireless communication interface of the wireless communication apparatus;
   determining whether the frequency band is the first frequency band not supported by the wireless communication interface of the wireless communication apparatus;
   determining whether the terminal index value indicates that the terminal device is to become the parent station rather than the wireless communication apparatus by determining whether the terminal index value is greater than an apparatus index value set in advance in the wireless communication apparatus; and
   forming the second wireless network in which a second frequency band different from the first frequency band is to be used by shifting the state of the wireless communication apparatus to the parent state, in a first case where it is determined that:
   the first frequency band is not supported by the wireless communication interface of the wireless communication apparatus, and
   the terminal index value indicates that the terminal device is to become the parent station rather than the wireless communication apparatus.

2. The wireless communication apparatus as in claim 1, wherein:
   the signal is received from the terminal device via the wireless communication interface, and
   the specific wireless network is a wireless network for performing a wireless communication of object data via the wireless communication interface.

3. The wireless communication apparatus as in claim 1, wherein
   the signal is a request signal for requesting the wireless communication apparatus to send a response signal including the apparatus index value.

4. The wireless communication apparatus as in claim 3, wherein:
   the computer-readable instructions, when executed by the processor, cause the wireless communication apparatus to further perform:
   sending, in the first case, the response signal including a specific index value different from the apparatus index value to the terminal device, the specific index value being a value indicating that the wireless communication apparatus is to become the parent station rather than the terminal device, and
   in the first case, the second wireless network in which the second frequency band is to be used is formed, after the response signal has been sent to the terminal device.

5. The wireless communication apparatus as in claim 3, wherein:
   the computer-readable instructions, when executed by the processor, cause the wireless communication apparatus to further perform:
   sending, in a second case where it is determined that the wireless communication apparatus is more likely to become the parent station than the terminal device, the response signal including the apparatus index value to the terminal device, and
   in the second case, the second wireless network in which the second frequency band is to be used is formed, after the response signal has been sent to the terminal device.

6. The wireless communication apparatus as in claim 3, wherein:
   the computer-readable instructions, when executed by the processor, cause the wireless communication apparatus to further perform:
   sending the response signal including the apparatus index value to the terminal device, in a third case where it is determined that the frequency band is the second frequency band supported by the wireless communication apparatus,
   the second wireless network in which the second frequency band is to be used is formed, after the response signal has been sent to the terminal device, in the third case and in a case where a relationship between the terminal index value and the apparatus index value indicates that the wireless communication apparatus is to become the parent station rather than the terminal device, and
   the computer-readable instructions, when executed by the processor, cause the wireless communication apparatus to further perform:
   participating in the first wireless network in which the second frequency band is to be used after the response signal has been sent to the terminal device, in the third case and in a case where the relationship between the terminal index value and the apparatus index value indicates that the terminal device is to become the parent station rather than the wireless communication apparatus.

7. The wireless communication apparatus as in claim 1, wherein:
the signal is a first response signal with regard to a first request signal for forming the specific wireless network,
the computer-readable instructions, when executed by the processor, cause the wireless communication apparatus to further perform:
sending the first request signal including the apparatus index value; and
sending, in the first case, a first type of signal indicating that it is not permitted to form the first wireless network to the terminal device, and
the second wireless network in which the second frequency band is to be used is formed, after the first type of signal has been sent to the terminal device.

8. The wireless communication apparatus as in claim 7, further comprising:
a wireless communication interface,
wherein the first request signal is sent to the terminal device via the wireless communication interface,
wherein the first response signal is received from the terminal device via the wireless communication interface,
wherein the first type of signal is sent to the terminal device via the wireless communication interface,
wherein the specific wireless network is a wireless network for performing a wireless communication of object data via the wireless communication interface, and
wherein the specific wireless network does not support the first frequency band and supports the second frequency band.

9. The wireless communication apparatus as in claim 7, wherein:
the computer-readable instructions, when executed by the processor, cause the wireless communication apparatus to further perform:
sending a second request signal for forming the specific wireless network to the terminal device, after the first type of signal being sent, the second request signal including a specific index value different from both of the apparatus index value and the terminal index value, the specific index value being a value indicating that the wireless communication apparatus is to become the parent station rather than the terminal device;
receiving a second response signal with regard to the second request signal from the terminal device, the second response signal including the related information and the terminal index value; and
sending, in a case where the second response signal is received, a second type of signal indicating that formation of the second wireless network to the terminal device is allowed,
the second wireless network in which the second frequency band is to be used is formed, after the second type of signal has been sent to the terminal device.

10. The wireless communication apparatus as in claim 7, wherein:
the computer-readable instructions, when executed by the processor, cause the wireless communication apparatus to further perform:

storing, in the first case, first identification information for identifying the terminal device in a memory, the first identification information being included in the first response signal;
receiving, from an external device, a third request signal for forming a wireless network including the wireless communication apparatus and the external device, the third request signal including second identification information for identifying the external device;
determining whether the external device is identical to the terminal device by determining whether the second identification information included in the third request signal is identical to the first identification information in the memory; and
sending, in a case where it is determined that the external device is identical to the terminal device, a third response signal including a specific index value different from both of the apparatus index value and the terminal index value, the specific index value being a value indicating that the wireless communication apparatus is to become the parent station rather than the terminal device, and
the second wireless network in which the second frequency band is to be used is formed, after a third type of signal has been sent to the terminal device.

11. The wireless communication apparatus as in claim 7, wherein:
the computer-readable instructions, when executed by the processor, cause the wireless communication apparatus to further perform:
forming a predetermined wireless network in which the second frequency band is to be used is formed, by causing the wireless communication apparatus to autonomously operate as the parent station, the predetermined wireless network only including the wireless communication apparatus, and
the second wireless network is formed after forming the predetermined wireless network, by sending an invitation signal for inviting the terminal device to the predetermined wireless network so as to cause the terminal device to participate in the predetermined wireless network.

12. The wireless communication apparatus as in claim 1, wherein determining whether the terminal index value indicates that the terminal device is to become the parent station rather than the wireless communication apparatus includes:
determining that the terminal device is to become the parent station in response to determining that the terminal index value is not greater than an apparatus index value.

13. A non-transitory computer-readable medium storing computer-readable instructions for a wireless communication apparatus, wherein
the computer-readable instructions, when executed by a processor mounted on the wireless communication apparatus, cause the wireless communication apparatus to perform:
receiving, from a terminal device, a signal for forming a specific wireless network including the wireless communication apparatus and the terminal device, the specific wireless network being either of a first wireless network or a second wireless network, the first wireless network being a network in which the terminal device operates as a parent station and the wireless communication apparatus operates as a child station, the second wireless network being a network in which the wireless communication apparatus operates as the parent station and the terminal device operates as the child station, the signal including, related information related to a frequency band to be used in the first wireless network, and a terminal index value being set in advance in the terminal device, wherein the terminal device supports both a first frequency band not supported by a wireless communication interface of the wireless communication apparatus and a second frequency band supported by the wireless communication interface of the wireless communication apparatus;

determining whether the frequency band is the first frequency band not supported by the wireless communication interface of the wireless communication apparatus;

determining whether the terminal index value indicates that the terminal device is to become the parent station rather than the wireless communication apparatus by determining whether the terminal index value is greater than an apparatus index value set in advance in the wireless communication apparatus; and forming the second wireless network in which a second frequency band different from the first frequency band is to be used by shifting the state of the wireless communication apparatus to the parent state, in a first case where it is determined that:
  the first frequency band is not supported by the wireless communication interface of the wireless communication apparatus, and
  the terminal index value indicates that the terminal device is to become the parent station rather than the wireless communication apparatus.

* * * * *